(12) United States Patent
Benveniste

(10) Patent No.: US 8,068,449 B2
(45) Date of Patent: *Nov. 29, 2011

(54) HYBRID COORDINATION FUNCTION (HCF) ACCESS THROUGH TIERED CONTENTION AND OVERLAPPED WIRELESS CELL MITIGATION

(75) Inventor: Mathilde Benveniste, South Orange, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 774 days.

This patent is subject to a terminal disclaimer.

(21) Appl. No.: 12/124,083

(22) Filed: May 20, 2008
(Under 37 CFR 1.47)

(65) Prior Publication Data
US 2008/0291873 A1 Nov. 27, 2008

Related U.S. Application Data

(63) Continuation of application No. 11/555,244, filed on Oct. 31, 2006, now Pat. No. 7,379,432.

(51) Int. Cl.
H04J 3/08 (2006.01)
H04W 4/00 (2009.01)
H04B 7/212 (2006.01)
H04L 12/413 (2006.01)

(52) U.S. Cl. ......... 370/326; 370/328; 370/337; 370/447

(58) Field of Classification Search .......... 370/310–350, 370/400–401, 208, 280–281, 437, 445–449, 370/461–468, 478–480; 455/69, 522, 561, 455/427
See application file for complete search history.

(56) References Cited

U.S. PATENT DOCUMENTS
4,987,571 A 1/1991 Haymond et al.
(Continued)

FOREIGN PATENT DOCUMENTS
EP 0994604 A2 4/2000
(Continued)

OTHER PUBLICATIONS

"Amendment- Radio Equipment and Systems (RES); High Performance Radio Local Area Network (HIPERLAN) Type 1; Functional Specification", ETSI, ETS 300 652, May 1997, pp. 1-21.
(Continued)

*Primary Examiner* — Tri H Phan

(57) ABSTRACT

A method and system reduce interference between overlapping first and second wireless LAN cells in a medium. Each cell includes a respective plurality of member stations and there is at least one overlapped station occupying both cells. An inter-cell contention-free period value is assigned to a first access point station in the first cell, associated with an accessing order in the medium for member stations in the first and second cells. The access point transmits a beacon packet containing the inter-cell contention-free period value, which is intercepted at the overlapped station. The overlapped station forwards the inter-cell contention-free period value to member stations in the second cell. A second access point in the second cell can then delay transmissions by member stations in the second cell until after the inter-cell contention-free period expires. The beacon packet sent by the first access point station also includes an intra-cell contention-free period value, which causes the member stations in the first cell to delay accessing the medium until polled by the first access point. After the expiration of the intra-cell contention-free period, member stations in the first cell may contend for the medium based on the quality of service (QoS) data they are to transmit, using the Tiered Contention Multiple Access (TCMA) protocol.

15 Claims, 22 Drawing Sheets

U.S. PATENT DOCUMENTS

| | | | |
|---|---|---|---|
| 5,142,533 | A | 8/1992 | Crisler et al. |
| 5,185,739 | A | 2/1993 | Spear |
| 5,329,531 | A | 7/1994 | Diepstraten et al. |
| 5,353,287 | A | 10/1994 | Kuddes et al. |
| 5,355,375 | A | 10/1994 | Christensen |
| 5,416,780 | A | 5/1995 | Patel |
| 5,471,631 | A | 11/1995 | Beardsley et al. |
| 5,636,223 | A | 6/1997 | Reardon et al. |
| 5,644,576 | A | 7/1997 | Bauchot et al. |
| 5,682,381 | A | 10/1997 | Sekihata et al. |
| 5,768,267 | A | 6/1998 | Raith et al. |
| 5,828,663 | A | 10/1998 | Ikegami |
| 5,852,405 | A | 12/1998 | Yoneda et al. |
| 5,852,723 | A | 12/1998 | Kalkunte et al. |
| 5,892,769 | A | 4/1999 | Lee |
| 5,987,033 | A | 11/1999 | Boer et al. |
| 5,999,818 | A | 12/1999 | Gilbert et al. |
| 6,011,784 | A | 1/2000 | Brown et al. |
| 6,047,175 | A | 4/2000 | Trompower |
| 6,052,594 | A | 4/2000 | Chuang et al. |
| 6,055,578 | A | 4/2000 | Williams et al. |
| 6,067,291 | A | 5/2000 | Kamerman et al. |
| 6,078,591 | A | 6/2000 | Kalkunte |
| 6,199,170 | B1 | 3/2001 | Dietrich |
| 6,246,702 | B1 | 6/2001 | Fellman et al. |
| 6,272,117 | B1 | 8/2001 | Choi et al. |
| 6,343,071 | B1 | 1/2002 | Lansford |
| 6,418,148 | B1 | 7/2002 | Kumar et al. |
| 6,434,187 | B1 | 8/2002 | Beard et al. |
| 6,473,414 | B1 | 10/2002 | Hartley et al. |
| 6,490,727 | B1 | 12/2002 | Nazarathy et al. |
| 6,493,331 | B1 | 12/2002 | Walton et al. |
| 6,614,799 | B1 | 9/2003 | Gummalia et al. |
| 6,625,162 | B2 | 9/2003 | Myojo et al. |
| 6,661,804 | B2 | 12/2003 | Fellman et al. |
| 6,697,013 | B2 | 2/2004 | McFarland et al. |
| 6,698,022 | B1 | 2/2004 | Wu |
| 6,754,176 | B1 | 6/2004 | Gubbi et al. |
| 6,791,997 | B2 | 9/2004 | Beyer et al. |
| 6,795,418 | B2 | 9/2004 | Choi |
| 6,832,093 | B1 | 12/2004 | Ranta |
| 6,865,609 | B1 | 3/2005 | Gubbi et al. |
| 6,907,023 | B2 | 6/2005 | McKenna et al. |
| 6,963,549 | B1 | 11/2005 | Jayaraman et al. |
| 6,985,499 | B2 | 1/2006 | Elliot |
| 7,024,200 | B2 | 4/2006 | McKenna et al. |
| 7,095,754 | B2 | 8/2006 | Benveniste |
| 7,136,361 | B2 | 11/2006 | Benveniste |
| 7,180,905 | B2 | 2/2007 | Benveniste |
| 7,221,681 | B2 | 5/2007 | Choi et al. |
| 7,245,604 | B2 | 7/2007 | Benveniste |
| 7,245,605 | B2 | 7/2007 | Benveniste |
| 7,248,600 | B2 | 7/2007 | Benveniste |
| 7,251,232 | B1 | 7/2007 | Meier |
| 7,266,085 | B2 | 9/2007 | Stine |
| 7,277,413 | B2 | 10/2007 | Benveniste |
| 7,277,415 | B2 | 10/2007 | Benveniste |
| 7,280,517 | B2 | 10/2007 | Benveniste |
| 7,286,827 | B2 | 10/2007 | McKenna et al. |
| 7,379,432 | B2 | 5/2008 | Benveniste |
| 7,409,700 | B1 | 8/2008 | Watson |
| 7,773,625 | B2 | 8/2010 | Benveniste |
| 2002/0061031 | A1 | 5/2002 | Sugar et al. |
| 2002/0071448 | A1* | 6/2002 | Cervello et al. ............... 370/445 |
| 2002/0152324 | A1 | 10/2002 | Sherman |
| 2002/0172186 | A1 | 11/2002 | Larsson |
| 2002/0188723 | A1 | 12/2002 | Choi et al. |
| 2003/0013451 | A1 | 1/2003 | Walton |
| 2003/0103521 | A1 | 6/2003 | Raphaeli et al. |
| 2003/0117984 | A1 | 6/2003 | Gavette |
| 2003/0123405 | A1 | 7/2003 | Del Prado et al. |
| 2003/0161340 | A1 | 8/2003 | Sherman |
| 2003/0224787 | A1 | 12/2003 | Gandolfo |
| 2004/0022219 | A1 | 2/2004 | Mangold et al. |
| 2004/0047319 | A1 | 3/2004 | Elg |
| 2006/0002357 | A1 | 1/2006 | Sherman |
| 2006/0041676 | A1 | 2/2006 | Sherman |
| 2007/0263581 | A1* | 11/2007 | Benveniste ............... 370/338 |
| 2008/0002632 | A1 | 1/2008 | Pandey et al. |
| 2008/0013508 | A1 | 1/2008 | Benveniste |
| 2008/0013509 | A1 | 1/2008 | Benveniste |
| 2008/0013515 | A1 | 1/2008 | Benveniste |
| 2008/0013522 | A1 | 1/2008 | Benveniste |
| 2008/0019329 | A1* | 1/2008 | Benveniste ............... 370/337 |
| 2008/0019343 | A1 | 1/2008 | Benveniste |

FOREIGN PATENT DOCUMENTS

| | | | |
|---|---|---|---|
| WO | WO 03-039054 | A2 | 5/2003 |
| WO | WO 03041427 | A1 * | 5/2003 |

OTHER PUBLICATIONS

"Broadband Radio Access Network (BRAN); HIPERLAN type 2; System Overview", ETSI, ETSI TR 101 683 VI.1.1 (Feb. 2000), Technical Report, pp. 1-19.

"Broadband Radio Access Networks (BRAN); HIPERLAN Type 2; Data Link Control (DLC) Layer; Part 4: Extension for Home Environment" ETSI, ETSI TS 101 761-4 VI.2.1. (Dec. 2000), pp. 1-125.

Diepstraten, "Wireless Access Method and Physical Specification", IEEE, IEEE P802.11-93/70, May 1993, pp. 1-16 slides 1-6.

White, "Wireless Access Method and Physical Layer Specifications", IEEE, IEEE P802.11-93/159, Sep. 1993, pp. 1-8.

Diepstraten et al. Wireless Access Method and Physical Specification, IEEE, IEEE 0802.11-94/150, Jul. 1994, pp. 1-12, Slides 1-11 & 1-23.

Andrew S. Tanenbaum, *Computer Networks*, 3ed, 1996 Prentice Hall, Chapter 4, "The Medium Access Sublayer", pp. 243-338.

James L. Massey, "Collision-Resolution Algorithms and Random-Access Communications,"Multi-User Communication Systems, edited by G. Long, Universita' di Trieste, 1981 by CISM, Udine, pp. 73-137.

Leonard Kleinrock et al., "Packet Switching in Radio Channels: Part I—Carrier Sense Multiple-Access Modes and Their Throughput-Delay Characteristics," IEEE Transactions on Communications, vol. Com-23, No. 12, Dec. 1975, pp. 1400-1416.

Ronald L. Rivest, "Network Control by Bayesian Broadcast," IEEE Transaction on Information Theory, vol. IT-33, May 1987, pp. 323-328.

Phil Karn, "MACA-A New Channel Access Method for Packet Radio," $9^{th}$ Computer Networking Conference, ARRL/CRRL Amateur Radio, 1990, pp. 134-140.

Vaduvur Bharghavan et al., "MACAU: A Media Access Protocol for Wireless LAN's", Computer Communication Review, vol. 24, No. 4, Oct. 1994, pp. 212-225.

The Bluetooth Special Interest group, Specification of Bluetooth System, Version 1.1, Feb. 22, 2001, pp. 41-47.

IEEE Std. 802.11, "Local and Metropolitan Area Networks", 1997, p. 92.

Bononi, L., et al. "Design and Performance Evaluation of an Asymptotically Optimal Backoff Algorithm for IEEE 802.11 Wireless LANs", Proceeding of the $33^{rd}$ Hawaii International Conference on System Sciences—2000, Jan. 4-7, 2000, pp. 1-10.

Deng, Dr-Jiunn, et al. "A Priority Scheme for IEEE 802.11 DCF Access Method", IEICE Trans. Communication, Jan. 1999, vol. E82-B, No. 1.

* cited by examiner

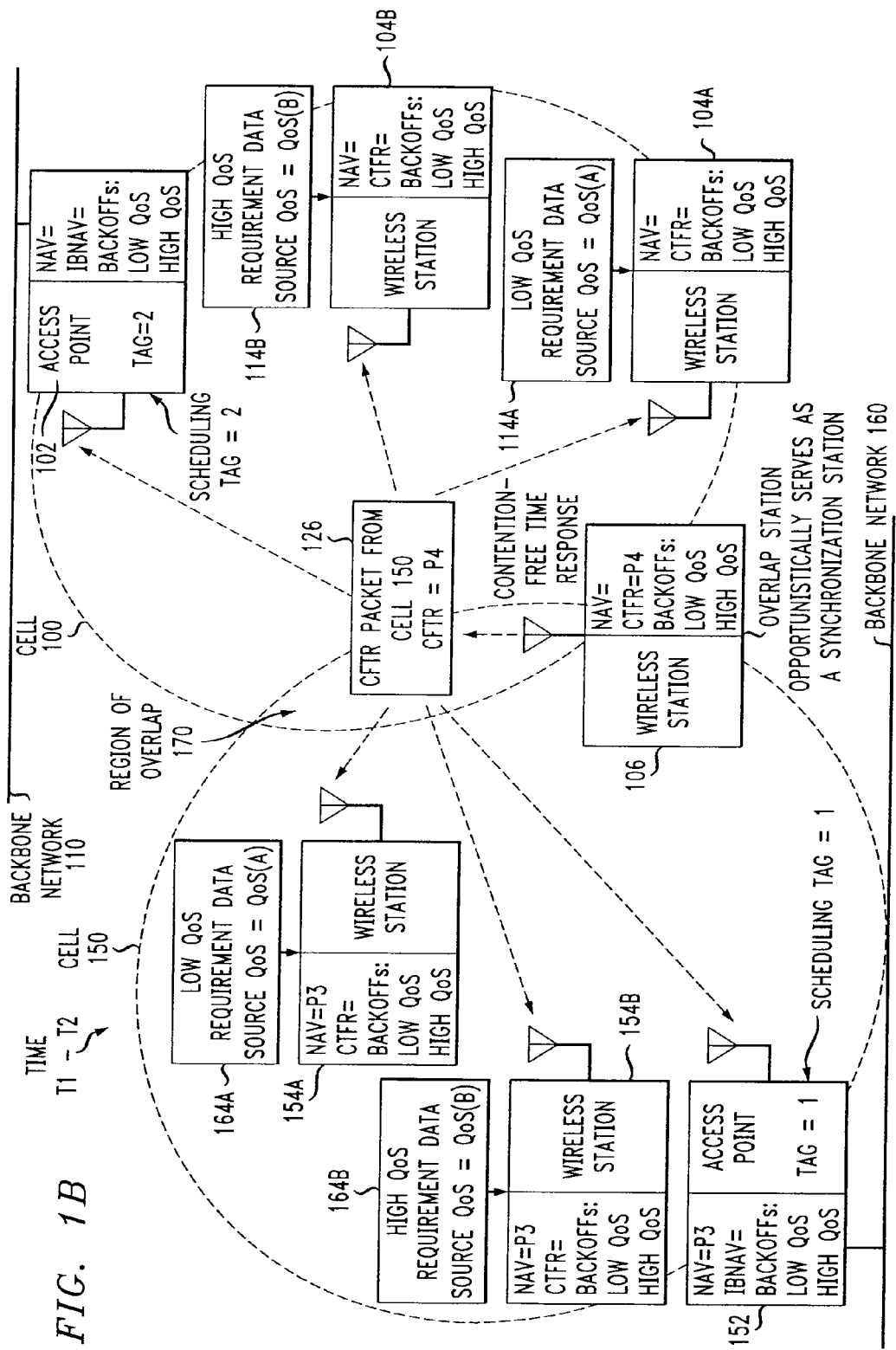

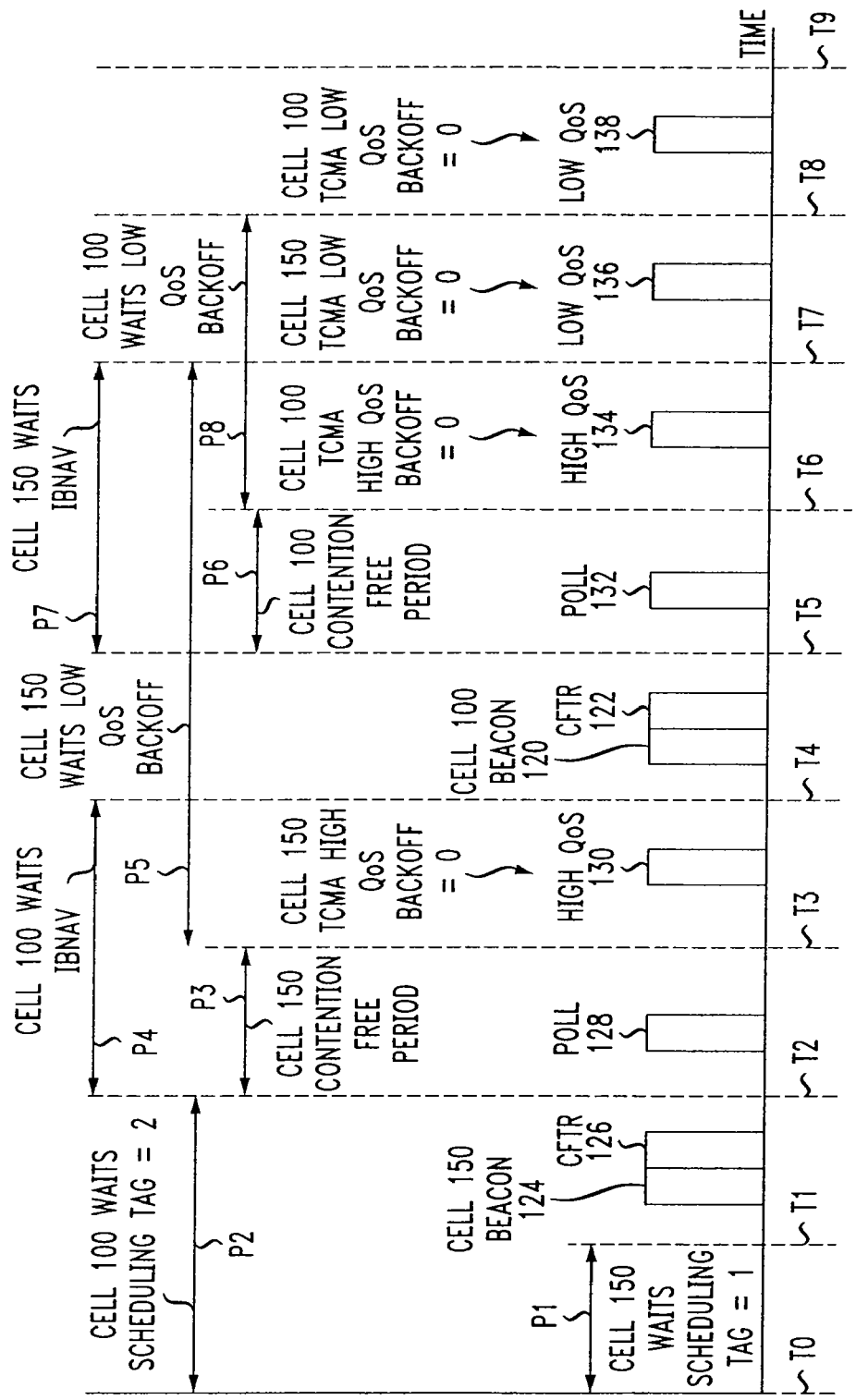

FIG. 1L

IEEE 802.11 PACKET STRUCTURE FOR BEACON

| FRAME CONTROL | ADDRESSES 1, 2, 3, 4 | SEQUENCE CONTROL | FRAME BODY – INFORMATION ELEMENT ||| |
|---|---|---|---|---|---|
| | | | ID = BEACON | LENGTH | ΔNAV = P3 | CFTR = P4 |

IEEE 802.11 PACKET STRUCTURE FOR CONTENTION-FREE TIME RESPONSE (CFTR)

| FRAME CONTROL | ADDRESSES 1, 2, 3, 4 | SEQUENCE CONTROL | FRAME BODY – INFORMATION ELEMENT ||| |
|---|---|---|---|---|---|
| | | | ELEMENT ID=254 | LENGTH | CONTENTION-FREE TIME RESPONSE CFTR = P4 |

360, 361, 363, 364, 362, 365, 366, 367

HYBRID COORDINATION FUNCTION (HCF) ACCESS THROUGH TIERED CONTENTION AND OVERLAPPED WIRELESS CELL MITIGATION

This application is a continuation of U.S. patent application Ser. No. 11/555,244 filed on Oct. 31, 2006 now U.S. Pat. No. 7,379,432, entitled "HYBRID COORDINATION FUNCTION (HCF) ACCESS THROUGH TIERED CONTENTION AND OVERLAPPED WIRELESS CELL MITIGATION" (now allowed), which claims priority from U.S. patent application Ser. No. 10/187,158 filed on Jun. 28, 2002, entitled "HYBRID COORDINATION FUNCTION (HCF) ACCESS THROUGH TIERED CONTENTION AND OVERLAPPED WIRELESS CELL MITIGATION" (now U.S. Pat. No. 7,136,361), which claims priority from U.S. Provisional Patent Application Nos. 60/302,661, filed Jul. 5, 2001; 60/304,122, filed Jul. 11, 2001; and 60/317,933, filed Sep. 10, 2001, all of which are incorporated herein by reference.

RELATED APPLICATIONS

This patent application is related to patent application Ser. No. 09/985,257, filed Nov. 2, 2001 entitled "TIERED CONTENTION MULTIPLE ACCESS (TCMA): A METHOD FOR PRIORITY-BASED SHARED CHANNEL ACCESS" (now U.S. Pat. No. 7,095,754), which is incorporated by reference.

FIELD OF THE INVENTION

The invention disclosed broadly relates to telecommunications methods and more particularly relates to Quality of Service (QoS) management in multiple access packet networks.

BACKGROUND OF THE INVENTION

Wireless Local Area Networks (WLANS)

Wireless local area networks (WLANs) generally operate at peak speeds of between 10 to 100 Mbps and have a typical range of 100 meters. Single cell Wireless LANs, are suitable for small single-floor offices or stores. A station in a wireless LAN can be a personal computer, a bar code scanner, or other mobile or stationary device that uses a wireless network interface card (NIC) to make the connection over the RF link to other stations in the network. The single-cell wireless LAN provides connectivity within radio range between wireless stations. An access point allows connections via the backbone network, to wired network-based resources, such as servers. A single cell wireless LAN can typically support up to 25 users and still keep network access delays at an acceptable level. Multiple cell wireless LANs provide greater range than does a single cell, by means of a set of access points and a wired network backbone to interconnect a plurality of single cell LANs. Multiple cell wireless LANs can cover larger multiple-floor buildings. A mobile laptop computer or data collector with a wireless network interface card (NIC) can roam within the coverage area while maintaining a live connection to the backbone network.

Wireless LAN specifications and standards include the IEEE 802.11 Wireless LAN Standard and the HIPERLAN Type 1 and Type 2 Standards. The IEEE 802.11 Wireless LAN Standard is published in three parts as IEEE 802.11-1999; IEEE 802.11a-1999; and IEEE 802.11b-1999, which are available from the IEEE, Inc. web site http://grouper.ieee.org/groups/802/11. An overview of the HIPERLAN Type 1 principles of operation is provided in the publication *HIPERLAN Type 1 Standard*, ETSI ETS 300 652, WA2 December 1997. An overview of the HIPERLAN Type 2 principles of operation is provided in the Broadband Radio Access Networks (BRAN), *HIPERLAN Type 2; System Overview*, ETSI TR 101 683 VI.I.1 (2000-02) and a more detailed specification of its network architecture is described in *HIPERLAN Type 2, Data Link Control (DLC) Layer; Part 4, Extension for Home Environment*, ETSI TS 101 761-4 V1.2.1 (2000-12). A subset of wireless LANs is Wireless Personal Area Networks (PANs), of which the Bluetooth Standard is the best known. The Bluetooth Special Interest Group, *Specification Of The Bluetooth System*, Version 1.1, Feb. 22, 2001, describes the principles of Bluetooth device operation and communication protocols.

The IEEE 802.11 Wireless LAN Standard defines at least two different physical (PHY) specifications and one common medium access control (MAC) specification. The IEEE 802.11(a) Standard is designed to operate in unlicensed portions of the radio spectrum, usually either in the 2.4 GHz Industrial, Scientific, and Medical (ISM) band or the 5 GHz Unlicensed-National Information Infrastructure (U-NII) band. It uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can also have an independent configuration where the mobile stations communicate directly with one another, without support from a fixed access point.

A single cell wireless LAN using the IEEE 802.11 Wireless LAN Standard is an Independent Basic Service Set (IBSS) network. An IBSS has an optional backbone network and consists of at least two wireless stations. A multiple cell wireless LAN using the IEEE 802.11 Wireless LAN Standard is an Extended Service Set (ESS) network. An ESS satisfies the needs of large coverage networks of arbitrary size and complexity.

Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the Physical Layer for transmission.

Before transmitting a frame, the MAC layer must first gain access to the network. Three interframe space (IFS) intervals defer an IEEE 802.11 station's access to the medium and provide various levels of priority. Each interval defines the duration between the end of the last symbol of the previous frame, to the beginning of the first symbol of the next frame. The Short Interframe Space (SIFS) provides the highest priority level by allowing some frames to access the medium before others, such as an Acknowledgement (ACK) frame, a Clear to Send (CTS) frame, or a subsequent fragment burst of a previous data frame. These frames require expedited access to the network to minimize frame retransmissions.

The Priority Interframe Space (PIFS) is used for high priority access to the medium during the contention-free period. The point coordinator in the access point connected to backbone network, controls the priority-based Point Coordination Function (PCF) to dictate which stations in cell can gain access to the medium. The point coordinator in the access point sends a contention-free poll frame to a station, granting the station permission to transmit a single frame to any destination. All other stations in the cell can only transmit during contention-free period if the point coordinator grants them access to the medium. The end of the contention-free period is signaled by the contention-free end frame sent by the point coordinator, which occurs when time expires or when the point coordinator has no further frames to transmit and no stations to poll.

The distributed coordination function (DCF) Interframe Space (DIFS) is used for transmitting low priority data frames during the contention-based period. The DIFS spacing delays the transmission of lower priority frames to occur later than the priority-based transmission frames. An Extended Interframe Space (EIFS) goes beyond the time of a DIFS interval, as a waiting period when a bad reception occurs. The EIFS interval provides enough time for the receiving station to send an acknowledgment (ACK) frame.

During the contention-based period, the distributed coordination function (DCF) uses the Carrier-Sense Multiple Access With Collision Avoidance (CSMA/CA) contention-based protocol, which is similar to IEEE 802.3 Ethernet. The CSMA/CA protocol minimizes the chance of collisions between stations sharing the medium, by waiting a random backoff interval, if the station's sensing mechanism indicates a busy medium. The period of time immediately following traffic on the medium is when the highest probability of collisions occurs, especially where there is high utilization. Once the medium is idle, CSMA/CA protocol causes each station to delay its transmission by a random backoff time, thereby minimizing the chance it will collide with those from other stations.

The CSMA/CA protocol computes the random backoff time as the product of a constant, the slot time, times a pseudo-random number RN which has a range of values from zero to a collision window CW. The value of the collision window for the first try to access the network is CW1, which yields the first try random backoff time. If the first try to access the network by a station fails, then the CSMA/CA protocol computes a new CW by doubling the current value of CW as CW2=CW1 times 2. The value of the collision window for the second try to access the network is CW2, which yields the second try random backoff time. This process by the CSMA/CA protocol of increasing the delay before transmission is called binary exponential backoff. The reason for increasing CW is to minimize collisions and maximize throughput for both low and high network utilization. Stations with low network utilization are not forced to wait very long before transmitting their frame. On the first or second attempt, a station will make a successful transmission. However, if the utilization of the network is high, the CSMA/CA protocol delays stations for longer periods to avoid the chance of multiple stations transmitting at the same time. If the second try to access the network fails, then the CSMA/CA protocol computes a new CW by again doubling the current value of CW as CW3=CW1 times 4. The value of the collision window for the third try to access the network is CW3, which yields the third try random backoff time. The value of CW increases to relatively high values after successive retransmissions, under high traffic loads. This provides greater transmission spacing between stations waiting to transmit.

Collision Avoidance Techniques

Four general collision avoidance approaches have emerged: [1] Carrier Sense Multiple Access (CSMA) [see, F. Tobagi and L. Kleinrock, "Packet Switching in Radio Channels: Part I—Carrier Sense Multiple Access Models and their Throughput Delay Characteristics", *IEEE Transactions on Communications*, Vol 23, No 12, Pages 1400-1416, 1975], [2] Multiple Access Collision Avoidance (MACA) [see, P. Karn, "MACA—A New Channel Access Protocol for Wireless Ad-Hoc Networks", *Proceedings of the ARRL/CRRL Amateur Radio Ninth Computer Networking Conference*, Pages 134-140, 1990.], [3] their combination CSMA/CA, and [4] collision avoidance tree expansion.

CSMA allows access attempts after sensing the channel for activity. Still, simultaneous transmit attempts lead to collisions, thus rendering the protocol unstable at high traffic loads. The protocol also suffers from the hidden terminal problem.

The latter problem was resolved by the MACA protocol, which involves a three-way handshake [P. Karn, supra]. The origin node sends a request to send (RTS) notice of the impending transmission. A response is returned by the destination if the RTS notice is received successfully and the origin node proceeds with the transmission. This protocol also reduces the average delay as collisions are detected upon transmission of merely a short message, the RTS. With the length of the packet included in the RTS and echoed in the clear to send (CTS) messages, hidden terminals can avoid colliding with the transmitted message. However, this prevents the back-to-back re-transmission in case of unsuccessfully transmitted packets. A five-way handshake MACA protocol provides notification to competing sources of the successful termination of the transmission. [see, V. Bharghavan, A. Demers, S. Shenker, and L. Zhang, "MACAW: A media access protocol for wireless LANs, *SIGCOMM* '94, Pages 212-225, ACM, 1994.]

CSMA and MACA are combined in CSMA/CA, which is MACA with carrier sensing, to give better performance at high loads. A four-way handshake is employed in the basic contention-based access protocol used in the Distributed Coordination Function (DCF) of the IEEE 802.11 Standard for Wireless LANs. [see, IEEE Standards Department, D3, "Wireless Medium Access Control and Physical Layer WG," *IEEE Draft Standard P802.11 Wireless LAN*, January 1996.]

Collisions can be avoided by splitting the contending terminals before transmission is attempted. In the pseudo-Bayesian control method, each terminal determines whether it has permission to transmit using a random number generator and a permission probability "p" that depends on the estimated backlog. [see, R. L. Rivest, "Network control by Bayesian Broadcast", *IEEE Trans. Inform. Theory*, Vol IT 25, pp. 505-515, September 1979]

To resolve collisions, subsequent transmission attempts are typically staggered randomly in time using the following two approaches: binary tree and binary exponential backoff.

Upon collision, the binary tree method requires the contending nodes to self-partition into two groups with specified probabilities. This process is repeated with each new collision. The order in which contending nodes transmit is determined either by serial or parallel resolution of the tree. [see, J. L. Massey, "Collision-resolution algorithms and random-access communications", in *Multi-User Communication Systems*, G. Longo (ed.), CISM Courses and Lectures No. 265. New York: Springer 1982, pp.73-137.]

In the binary exponential backoff approach, a backoff counter tracks the number of pauses and hence the number of completed transmissions before a node with pending packets attempts to seize the channel. A contending node initializes its backoff counter by drawing a random value, given the backoff window size. Each time the channel is found idle, the backoff counter is decreased and transmission is attempted upon expiration of the backoff counter. The window size is doubled every time a collision occurs, and the backoff countdown starts again [see, A. Tanenbaum, *Computer Networks*, 3$^{rd}$ ed., Upper Saddle River, N.J., Prentice Hall, 1996] The Distributed Coordination Function (DCF) of the IEEE 802.11 Standard for Wireless LANs employs a variant of this contention resolution scheme, a truncated binary exponential backoff, starting at a specified window and allowing up to a maximum backoff range below which transmission is attempted. [IEEE Standards Department, D3, supra] Different backoff counters may be maintained by a contending node for traffic to specific destinations. [Bharghavan, supra]

In the IEEE 802.11 Standard, the channel is shared by a centralized access protocol, the Point Coordination Function (PCF), which provides contention-free transfer based on a polling scheme controlled by the access point (AP) of a basic service set (BSS). [IEEE Standards Department, D3, supra] The centralized access protocol gains control of the channel and maintains control for the entire contention-free period by waiting a shorter time between transmissions than the stations using the Distributed Coordination Function (DCF) access procedure. Following the end of the contention-free period, the DCF access procedure begins, with each station contending for access using the CSMA/CA method.

The 802.11 MAC Layer provides both contention and contention-free access to the shared wireless medium. The MAC Layer uses various MAC frame types to implement its functions of MAC management, control, and data transmission. Each station and access point on an 802.11 wireless LAN implements the MAC Layer service, which enables stations to exchange packets. The results of sensing the channel to determine whether the medium is busy or idle, are sent to the MAC coordination function of the station. The MAC coordination also carries out a virtual carrier sense protocol based on reservation information found in the Duration Field of all frames. This information announces to all other stations, the sending station's impending use of the medium. The MAC coordination monitors the Duration Field in all MAC frames and places this information in the station's Network Allocation Vector (NAV) if the value is greater than the current NAV value. The NAV operates similarly to a timer, starting with a value equal to the Duration Field of the last frame transmission sensed on the medium, and counting down to zero. After the NAV reaches zero, the station can transmit, if its physical sensing of the channel indicates a clear channel.

At the beginning of a contention-free period, the access point senses the medium, and if it is idle, it sends a Beacon packet to all stations. The Beacon packet contains the length of the contention-free interval. The MAC coordination in each member station places the length of the contention-free interval in the station's Network Allocation Vector (NAV), which prevents the station from taking control of the medium until the end of the contention-free period. During the contention-free period, the access point can send a polling message to a member station, enabling it to send a data packet to any other station in the BSS wireless cell.

Quality of Service (QoS)

Quality of service (QoS) is a measure of service quality provided to a customer. The primary measures of QoS are message loss, message delay, and network availability. Voice and video applications have the most rigorous delay and loss requirements. Interactive data applications such as Web browsing have less restrained delay and loss requirements, but they are sensitive to errors Non-real-time applications such as file transfer, Email, and data backup operate acceptably across a wide range of loss rates and delay. Some applications require a minimum amount of capacity to operate at all, for example, voice and video. Many network providers guarantee specific QoS and capacity levels through the use of Service-Level Agreements (SLAs). An SLA is a contract between an enterprise user and a network provider that specifies the capacity to be provided between points in the network that must be delivered with a specified QoS. If the network provider fails to meet the terms of the SLA, then the user may be entitled a refund. The SLA is typically offered by network providers for private line, frame relay, ATM, or Internet networks employed by enterprises.

The transmission of time-sensitive and data application traffic over a packet network imposes requirements on the delay or delay jitter, and the error rates realized; these parameters are referred to generically as the QoS (Quality of Service) parameters. Prioritized packet scheduling, preferential packet dropping, and bandwidth allocation are among the techniques available at the various nodes of the network, including access points, that enable packets from different applications to be treated differently, helping achieve the different quality of service objectives. Such techniques exist in centralized and distributed variations. The concern herein is with distributed mechanisms for multiple access in cellular packet networks or wireless ad hoc networks.

Management of contention for the shared transmission medium must reflect the goals sought for the performance of the overall system. For instance, one such goal would be the maximization of goodput (the amount of good data transmitted as a fraction of the channel capacity) for the entire system, or of the utilization efficiency of the RF spectrum; another is the minimization of the worst-case delay. As multiple types of traffic with different performance requirements are combined into packet streams that compete for the same transmission medium, a multi-objective optimization is required.

Ideally, one would want a multiple access protocol that is capable of effecting packet transmission scheduling as close to the optimal scheduling as possible, but with distributed control. Distributed control implies both some knowledge of the attributes of the competing packet sources and limited control mechanisms.

To apply any scheduling algorithm in random multiple access, a mechanism must exist that imposes an order in which packets will seize the medium. For distributed control, this ordering must be achieved independently, without any prompting or coordination from a control node. Only if there is a reasonable likelihood that packet transmissions will be ordered according to the scheduling algorithm, can one expect that the algorithm's proclaimed objective will be attained.

The above cited, copending patent application by Mathilde Benveniste, entitled "Tiered Contention Multiple Access (TCMA): A Method for Priority-Based Shared Channel Access", describes the Tiered Contention Multiple Access (TCMA) distributed medium access protocol that schedules transmission of different types of traffic based on their QoS service quality specifications. This protocol makes changes to the contention window following the transmission of a frame, and therefore is also called Extended-DCF (E-DCF). During the contention window, the various stations on the network contend for access to the network. To avoid collisions, the MAC protocol requires that each station first wait for a randomly-chosen time period, called an arbitration time. Since this period is chosen at random by each station, there is less likelihood of collisions between stations. TCMA uses the contention window to give higher priority to some stations than to others. Assigning a short contention window to those stations that should have higher priority ensures that in most cases, the higher-priority stations will be able to transmit ahead of the lower-priority stations TCMA schedules transmission of different types of traffic based on their QoS service quality specifications. As seen in FIG. 1, which depicts the tiered contention mechanism, a station cannot engage in backoff countdown until the completion of an idle period of length equal to its arbitration time.

The above cited, copending patent application by Mathilde Benveniste also applies TCMA to the use of the wireless access point as a traffic director. This application of the TCMA protocol is called the hybrid coordination function (HCF). In HCF, the access point uses a polling technique as the traffic control mechanism. The access point sends polling packets to a succession of stations on the network. The individual stations can reply to the poll with a packet that contains not only the response, but also any data that needs to be transmitted. Each station must wait to be polled. The access point establishes a polling priority based on the QoS priority of each station.

What is needed in the prior art is a way to apply the hybrid coordination function (HCF) to wireless cells that have overlapping access points contending for the same medium.

SUMMARY OF THE INVENTION

In accordance with the invention, the Tiered Contention Multiple Access (TCMA) protocol is applied to wireless cells which have overlapping access points contending for the same medium. Quality of Service (QoS) support is provided to overlapping access points to schedule transmission of different types of traffic based on the service quality specifications of the access points.

The inventive method reduces interference in a medium between overlapping wireless LAN cells, each cell including an access point station and a plurality of member stations. In accordance with the invention, the method assigns to a first access point station in a first wireless LAN cell, a first scheduling tag. The scheduling tag has a value that determines an accessing order for the cell in a transmission frame, with respect to the accessing order of other wireless cells. The scheduling tag value is deterministically set. The scheduling tag value can be permanently assigned to the access point by its manufacturer, it can be assigned by the network administrator at network startup, it can be assigned by a global processor that coordinates a plurality of wireless cells over a backbone network, it can be drawn from a pool of possible tag values during an initial handshake negotiation with other wireless stations, or it can be cyclically permuted in real-time, on a frame-by-frame basis, from a pool of possible values, coordinating that cyclic permutation with that of other access points in other wireless cells.

An access point station in a wireless cell signals the beginning of an intra-cell contention-free period for member stations in its cell by transmitting a beacon packet. The duration of the intra-cell contention-free period is deterministically set. The member stations in the cell store the intra-cell contention-free period value as a Network Allocation Vector (NAV). Each member station in the cell decrements the value of the NAV in a manner similar to other backoff time values, during which it will delay accessing the medium.

In accordance with the invention, the method assigns to the first access point station, a first inter-cell contention-free period value, which gives notice to any other cell receiving the beacon packet, that the first cell has seized the medium for the period of time represented by the value. The inter-cell contention-free period value is deterministically set. Further in accordance with the invention, any station receiving the beacon packet immediately broadcasts a contention-free time response (CFTR) packet containing a copy of the first inter-cell contention-free period value. In this manner, the notice is distributed to a second access point station in an overlapping, second cell. The second access point stores the first inter-cell contention-free period value as an Inter-BSS Network Allocation Vector (IBNAV). The second access point decrements the value of IBNAV in a manner similar to other backoff time values, during which it will delay accessing the medium.

Still further in accordance with the invention, the method also assigns to first member stations in the first cell, a first shorter backoff value for high Quality of Service (QoS) data and a first longer backoff value for lower QoS data. The backoff time is the interval that a member station waits after the expiration of the contention-free period, before the member station contends for access to the medium. Since more than one member station in a cell may be competing for access, the actual backoff time for a particular station can be selected as one of several possible values. In one embodiment, the actual backoff time for each particular station is deterministically set, so as to reduce the length of idle periods. In another embodiment, the actual backoff time for each particular station is randomly drawn from a range of possible values between a minimum delay interval to a maximum delay interval. The range of possible backoff time values is a contention window. The backoff values assigned to a cell may be in the form of a specified contention window. High QoS data is typically isochronous data such as streaming video or audio data that must arrive at its destination at regular intervals. Low QoS data is typically file transfer data and email, which can be delayed in its delivery and yet still be acceptable. The Tiered Contention Multiple Access (TCMA) protocol coordinates the transmission of packets within a cell, so as to give preference to high QoS data over low QoS data, to insure that the required quality of service is maintained for each type of data.

The method similarly assigns to a second access point station in a second wireless LAN cell that overlaps the first sell, a second contention-free period value longer than the first contention-free period value. The method also assigns to second member stations in the second cell, a second shorter backoff value for high QoS data and a second longer backoff value for lower QoS data. The first and second cells are considered to be overlapped when one or more stations in the first cell inadvertently receive packets from member stations or the access point of the other cell. The invention reduces the interference between the overlapped cells by coordinating the timing of their respective transmissions, while maintaining the TCMA protocol's preference for the transmission of high QoS data over low QoS data in each respective cell.

During the operation of two overlapped cells, the method transmits a first beacon packet including the intra-cell contention-free period value (the increment to the NAV) and inter-cell contention-free period value (the CFTR), from the first access point to the first member stations in the first cell. The beacon packet is received by the member stations of the first cell and can be inadvertently received by at least one overlapped member station of the second cell. Each member station in the first cell increments its NAV with the intra-cell contention-free period value and stores the inter-cell contention-free period value as the CFTR.

In accordance with the invention, each station that receives the first beacon packet, immediately responds by transmitting a first contention-free time response (CFTR) packet that contains a copy of the inter-cell contention-free period value (CFTR). A CFTR packet is transmitted from the first member stations in the first cell and also by the overlapped member stations of the second cell. The effect of the transmission of CFTR packets from member stations in the second cell is to alert the second access point and the second member stations in the second cell, that the medium has been seized by the first access point in the first cell. When the second access point in the second cell receives the CFTR packet it stores the a copy of the inter-cell contention-free period value as the IBNAV.

Similar to a station's Network Allocation Vector (NAV), a first IBNAV is set at the second access point to indicate the time the medium will be free again. Also similar to the NAV, the first IBNAV is decremented with each succeeding slot, similar to the decrementing of other backoff times. When the second access point receives the first IBNAV representing the first cell's contention-free period value, the second access point must respect the first IBNAV value and delay transmitting its beacon packet and the exchange of other packets in the second cell until the expiration of the received, first IBNAV.

When the second access point has decremented the first IBNAV to zero, the second access point transmits its second beacon packet including its second contention-free period values of NAV and a second IBNAV, to the second member stations in the second cell. Each station that receives the second beacon packet immediately responds by transmitting a second contention-free time response (CFTR) packet that contains a copy of the second IBNAV inter-cell contention-free period value. The second CFTR packet is transmitted from the second member stations in the second cell and also by the overlapped member stations of the first cell. The effect of the transmission of the second CFTR packets from overlapped member stations in the first cell is to alert the first access point and the first member stations in the first cell, that the medium has been seized by the second access point in the second cell. When the first access point in the first cell receives the CFTR packet it stores the a copy of the second IBNAV inter-cell contention-free period value, to indicate the time the medium will be free again. The second IBNAV is decremented with each succeeding frame, similar to the decrementing of other backoff times.

The second member stations in the second cell wait for completion of the count down of their NAVs to begin the TCMA protocol of counting down the second shorter backoff for high QoS data and then transmitting second high QoS data packets.

Meanwhile, the first access point in the first cell waits for completion of the count down of the second IBNAV inter-cell contention-free period before starting the countdown of its own NAV for its own intra-cell contention-free period. The first member stations in the first cell wait for the count down of their NAVs, to begin the TCMA protocol of counting down the first longer backoff for low QoS data and then transmitting first low QoS data.

Meanwhile the second member stations are waiting for the TCMA protocol of counting down the second longer backoff for lower QoS data before transmitting the second lower QoS data.

In this manner, interference in a medium between overlapping wireless LAN cells is reduced.

Potential collisions between cells engaged in centralized access can be averted or resolved by the TCMA protocol. In accordance with the invention, deterministically set backoff delays are used, which tend to reduce the length of the idle periods. The possibility of coincident or overlapping contention-free periods between neighboring cells is eliminated through the use of an "interference sensing" method employing a new frame.

The invention enables communication of channel occupancy information to neighboring access points. When a beacon packet is transmitted, and before transmission of any other data or polling packets, all stations hearing the beacon will respond by sending a frame, the contention-free time response (CFTR), that will contain the duration of the contention-free period found in the beacon. An access point in neighboring cells, or stations attempting contention-based channel access, which receive this message from a station in the cell overlapping region, are thus alerted that the channel has been seized by an access point. Similar to a station's Network Allocation Vector (NAV), an Inter-Cell Network Allocation Vector at the access point accordingly indicates when the time the channel will be free again. Unless the Inter-Cell Network Allocation Vector is reset, the access point will decrease its backoff value only after the expiration of the Inter-Cell Network Allocation Vector, according to the backoff countdown rules.

In another aspect of the invention, potential collisions between different access points engaged in centralized access can be averted or resolved by using deterministic backoff delays, which avoid collisions between access points, and eliminate gaps between consecutive poll/response exchanges or contention-free bursts (CFBs) between the access point and its associated stations.

The resulting invention applies the Tiered Contention Multiple Access (TCMA) protocol to wireless cells which have overlapping access points contending for the same medium.

DESCRIPTION OF THE FIGURES

FIGS. 1A through 1J show the interaction of two wireless LAN cells which have overlapping access points contending for the same medium, in accordance with the invention.

FIG. 1K shows a timing diagram for the interaction of two wireless LAN cells in FIGS. 1A through 1J, in accordance with the invention.

FIG. 1L shows the IEEE 802.11 packet structure for a beacon packet, including the increment to the NAV period and the CFTR period, in accordance with the invention.

FIG. 1M shows the IEEE 802.11 packet structure for a CFTR packet, including the CFTR period, in accordance with the invention.

DISCUSSION OF THE PREFERRED EMBODIMENT

The invention disclosed broadly relates to telecommunications methods and more particularly relates to Quality-of-Service (QoS) management in multiple access packet networks. Several protocols, either centralized or distributed can co-exist on the same channel through the Tiered Contention Multiple Access method. The proper arbitration time to be assigned to the centralized access protocol must satisfy the following requirements: (i) the centralized access protocol enjoys top priority access, (ii) once the centralized protocol seizes the channel, it maintains control until the contention-free period ends, (iii) the protocols are backward compatible, and (iv) Overlapping Basic Service Sets (OBSSs) engaged in centralized-protocol can share the channel efficiently.

In accordance with the invention, the Tiered Contention Multiple Access (TCMA) protocol is applied to wireless cells which have overlapping access points contending for the same medium. Quality of Service (QoS) support is provided to overlapping access points to schedule transmission of different types of traffic based on the service quality specifications of the access points.

The inventive method reduces interference in a medium between overlapping wireless LAN cells, each cell including an access point station and a plurality of member stations. FIGS. 1A through 1J show the interaction of two wireless LAN cells which have overlapping access points contending for the same medium, in accordance with the invention. The method assigns to a first access point station in a first wireless LAN cell, a first scheduling tag. The scheduling tag has a value that determines an accessing order for the cell in a transmission frame, with respect to the accessing order of other wireless cells. The scheduling tag value is deterministically set. The scheduling tag value can be permanently assigned to the access point by its manufacturer, it can be assigned by the network administrator at network startup, it can be assigned by a global processor that coordinates a plurality of wireless cells over a backbone network, it can be drawn from a pool of possible tag values during an initial handshake negotiation with other wireless stations, or it can be cyclically permuted in real-time, on a frame-by-frame basis, from a pool of possible values, coordinating that cyclic permutation with that of other access points in other wireless cells.

Figure 1:
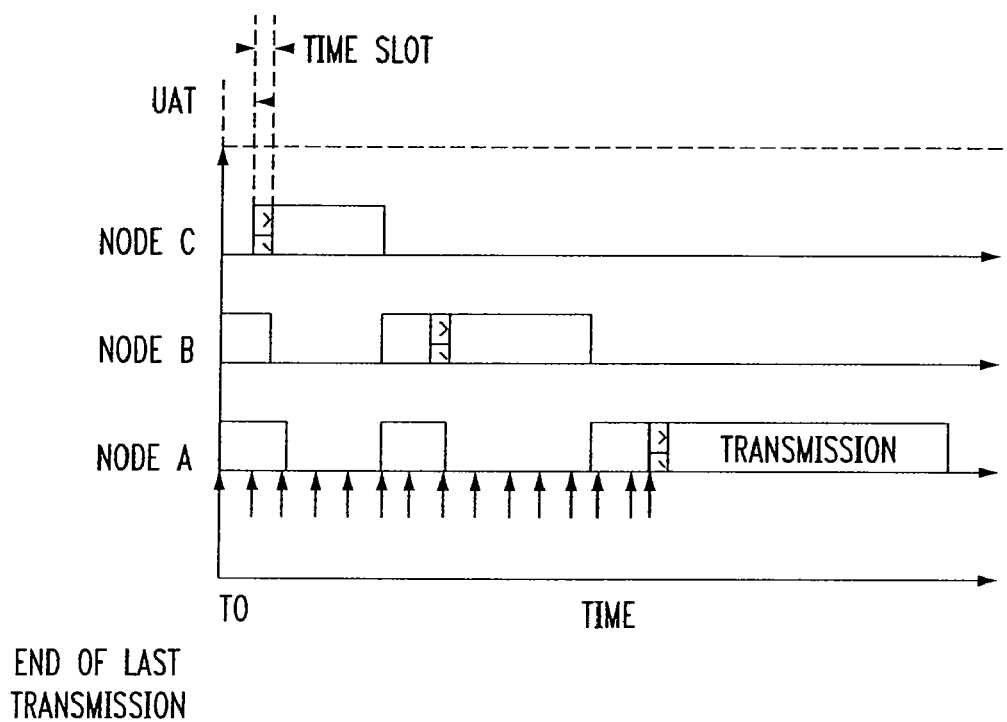
FIG. 1 depicts the tiered contention mechanism.
Figure 1A:
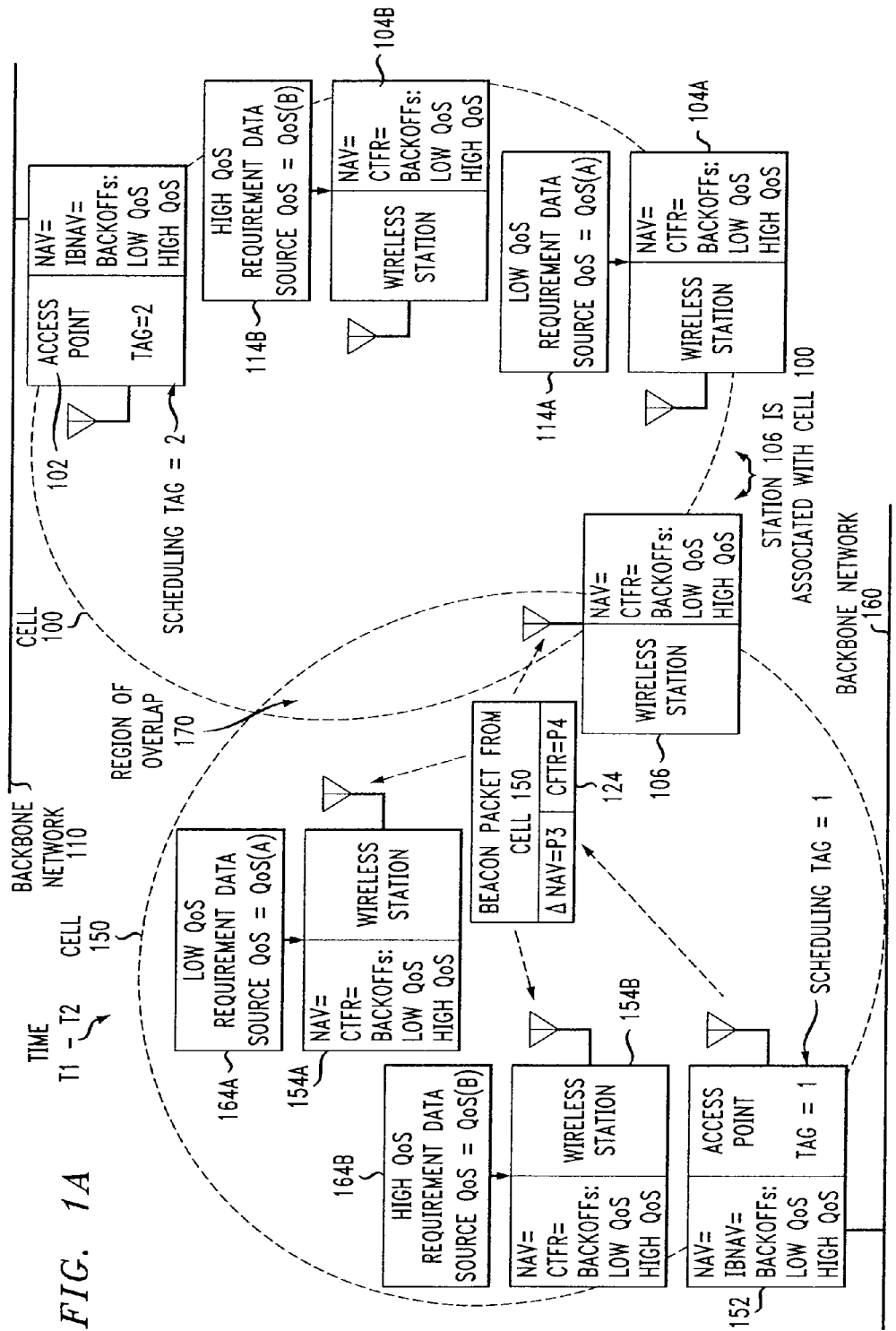

The interaction of the two wireless LAN cells 100 and 150 in FIGS. 1A through 1J is shown in the timing diagram of FIG. 1K. The timing diagram of FIG. 1K begins at instant T0, goes to instant T9, and includes periods P1 through P8, as shown in the figure. The various packets discussed below are also shown in FIG. 1K, placed at their respective times of occurrence. An access point station in a wireless cell signals the beginning of an intra-cell contention-free period for member stations in its cell by transmitting a beacon packet. FIG. 1A shows access point 152 of cell 150 connected to backbone network 160, transmitting the beacon packet 124. In accordance with the invention, the beacon packet 124 includes two contention-free period values, the first is the Network Allocation Vector (NAV) (or alternately its incremental value ΔNAV), which specifies a period value P3 for the intra-cell contention-free period for member stations in its own cell. Member stations within the cell 150 must wait for the period P3 before beginning the Tiered Contention Multiple Access (TCMA) procedure, as shown in FIG. 1K. The other contention-free period value included in the beacon packet 124 is the Inter-BSS Network Allocation Vector (IBNAV), which specifies the contention-free time response (CFTR) period P4. The contention-free time response (CFTR) period P4 gives notice to any other cell receiving the beacon packet, such as cell 100, that the first cell 150 has seized the medium for the period of time represented by the value P4.

The beacon packet 124 is received by the member stations 154A (with a low QoS requirement 164A) and 154B (with a high QoS requirement 164B) in the cell 150 during the period from T1 to T2. The member stations 154A and 154B store the value of ΔNAV=P3 and begin counting down that value during the contention free period of the cell 150. The duration of the intra-cell contention-free period ΔNAV=P3 is deterministically set. The member stations in the cell store the intra-cell contention-free period value P3 as the Network Allocation Vector (NAV). Each member station in the cell 150 decrements the value of the NAV in a manner similar to other backoff time values, during which it will delay accessing the medium. FIG. 1L shows the IEEE 802.11 packet structure 260 for the beacon packet 124 or 120, including the increment to the NAV period and the CFTR period. The beacon packet structure 260 includes fields 261 to 267. Field 267 specifies the ΔNAV value of P3 and the CFTR value of P4. In accordance with the invention, the method assigns to the first access point station, a first inter-cell contention-free period value, which gives notice to any other cell receiving the beacon packet, that the first cell has seized the medium for the period of time represented by the value. The inter-cell contention-free period value is deterministically set.

Further in accordance with the invention, any station receiving the beacon packet 124 immediately rebroadcasts a contention-free time response (CFTR) packet 126 containing a copy of the first inter-cell contention-free period value P4. The value P4 specifies the Inter-BSS Network Allocation Vector (IBNAV), i.e., the contention-free time response (CFTR) period that the second access point 102 must wait, while the first cell 150 has seized the medium. FIG. 1B shows overlap station 106 in the region of overlap 170 transmitting the CFTR packet 126 to stations in both cells 100 and 150 during the period from T1 to T2. FIG. 1M shows the IEEE 802.11 packet structure 360 for a CFTR packet 126 or 122, including the CFTR period. The CFTR packet structure 360 includes fields 361 to 367. Field 367 specifies the CFTR value of P4. In this manner, the notice is distributed to the second access point station 102 in the overlapping, second cell 100.

Figure 1C:
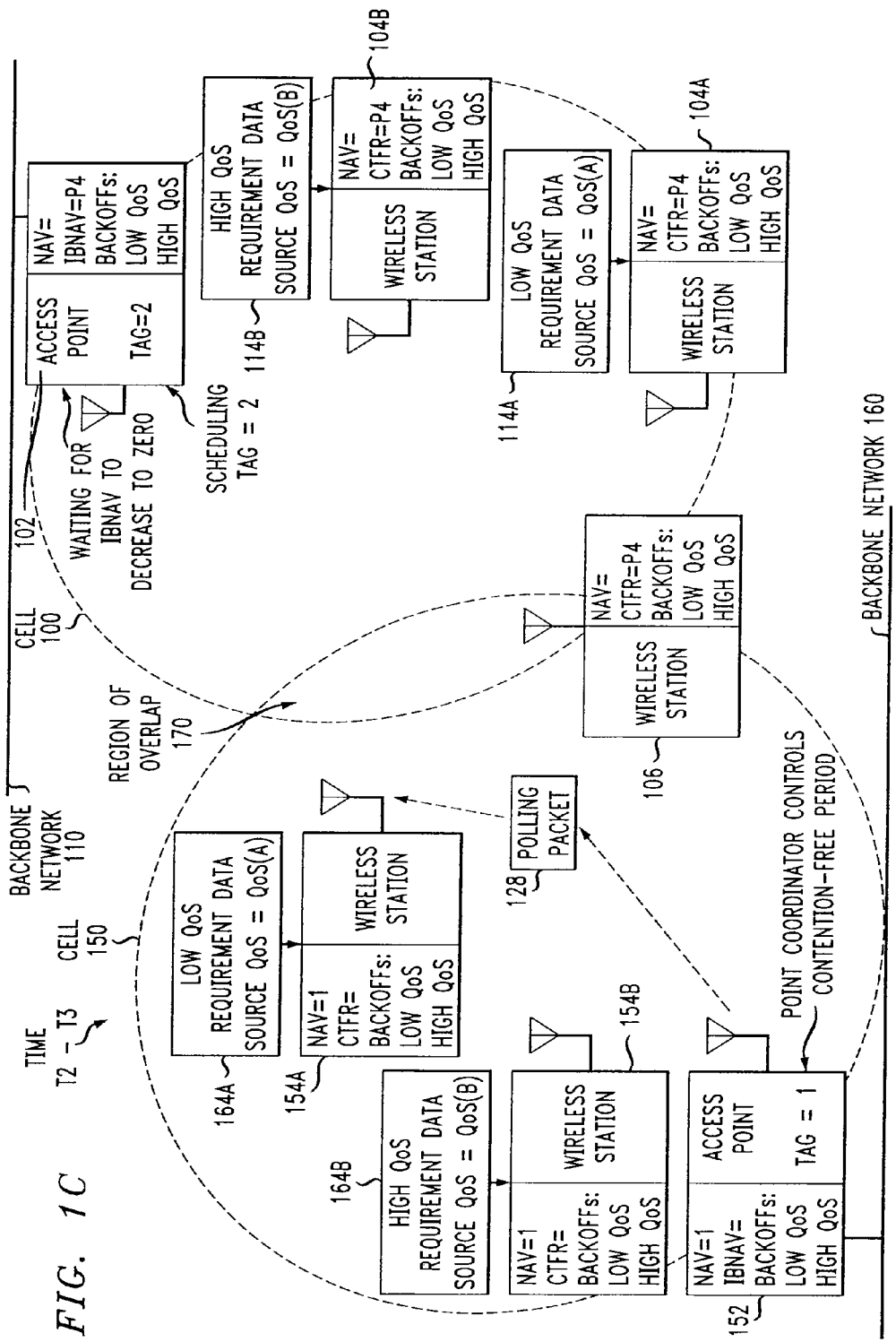

FIG. 1C shows the point coordinator in access point 152 of cell 150 controlling the contention-free period within the cell 150 by using the polling packet 128 during the period from T2 to T3. In the mean time, the second access point 102 in the second cell 100 connected to backbone network 110, stores the first inter-cell contention-free period value P4 received in the CFTR packet 126, which it stores as the Inter-BSS Network Allocation Vector (IBNAV). The second access point 102 decrements the value of IBNAV in a manner similar to other backoff time values, during which it will delay accessing the medium.

Figure 1D:
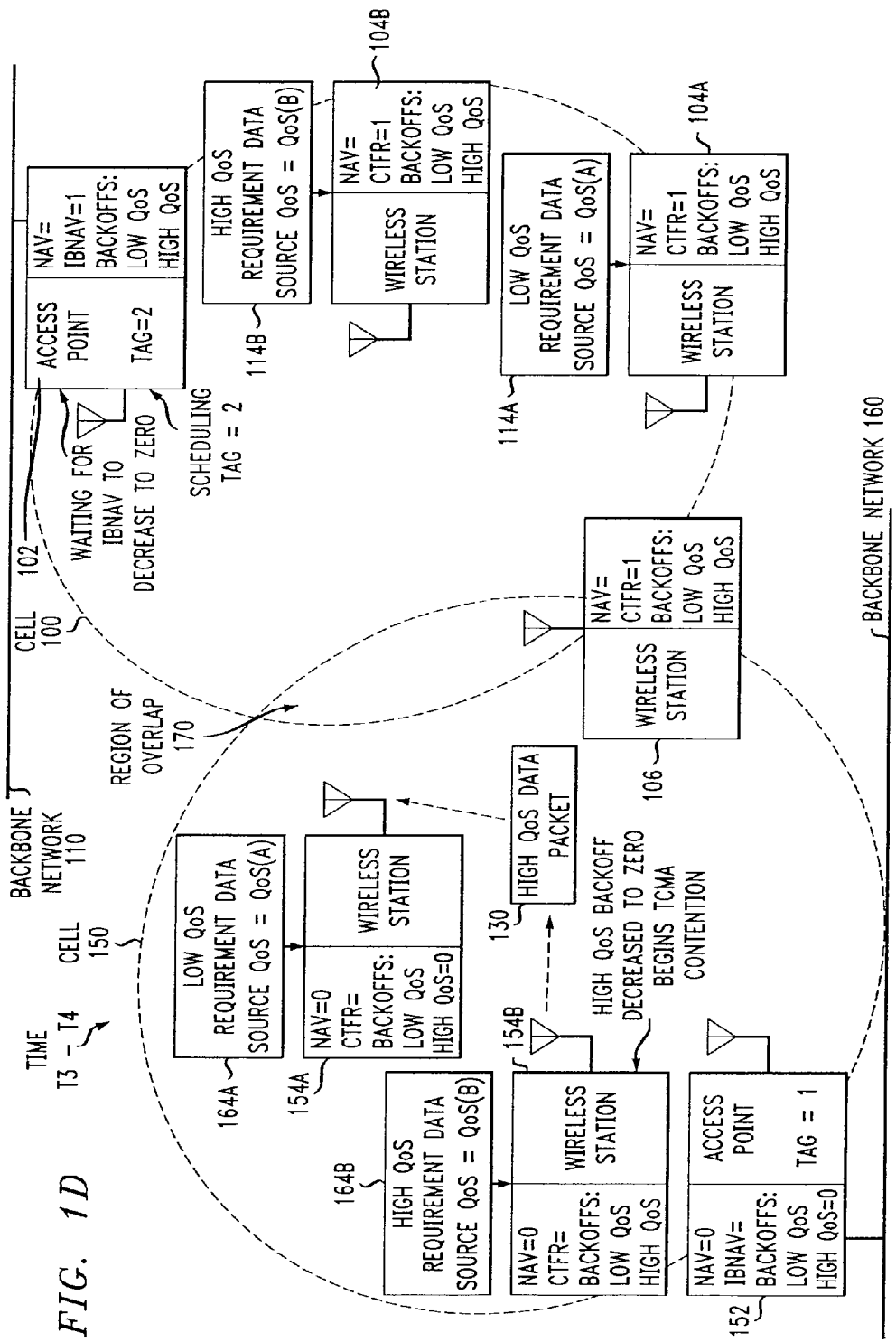

Still further in accordance with the invention, the method uses the Tiered Contention Multiple Access (TCMA) protocol to assign to first member stations in the first cell 150, a first shorter backoff value for high Quality of Service (QoS) data and a first longer backoff value for lower QoS data. FIG. 1D shows the station 154B in the cell 150, having a high QoS requirement 164B, decreasing its High QoS backoff period to zero and beginning TCMA contention to transmit its high QoS data packet 130 during the period from T3 to T4. The backoff time is the interval that a member station waits after the expiration of the contention-free period P3, before the member station 154B contends for access to the medium. Since more than one member station in a cell may be competing for access, the actual backoff time for a particular station can be selected as one of several possible values. In one embodiment, the actual backoff time for each particular station is deterministically set, so as to reduce the length of idle periods. In another embodiment, the actual backoff time for each particular station is randomly drawn from a range of possible values between a minimum delay interval to a maximum delay interval. The range of possible backoff time values is a contention window. The backoff values assigned to a cell may be in the form of a specified contention window. High QoS data is typically isochronous data such as streaming video or audio data that must arrive at its destination at regular intervals. Low QoS data is typically file transfer data and email, which can be delayed in its delivery and yet still be acceptable. The Tiered Contention Multiple Access (TCMA) protocol coordinates the transmission of packets within a cell, so as to give preference to high QoS data over low QoS data, to insure that the required quality of service is maintained for each type of data.

Figure 1E:
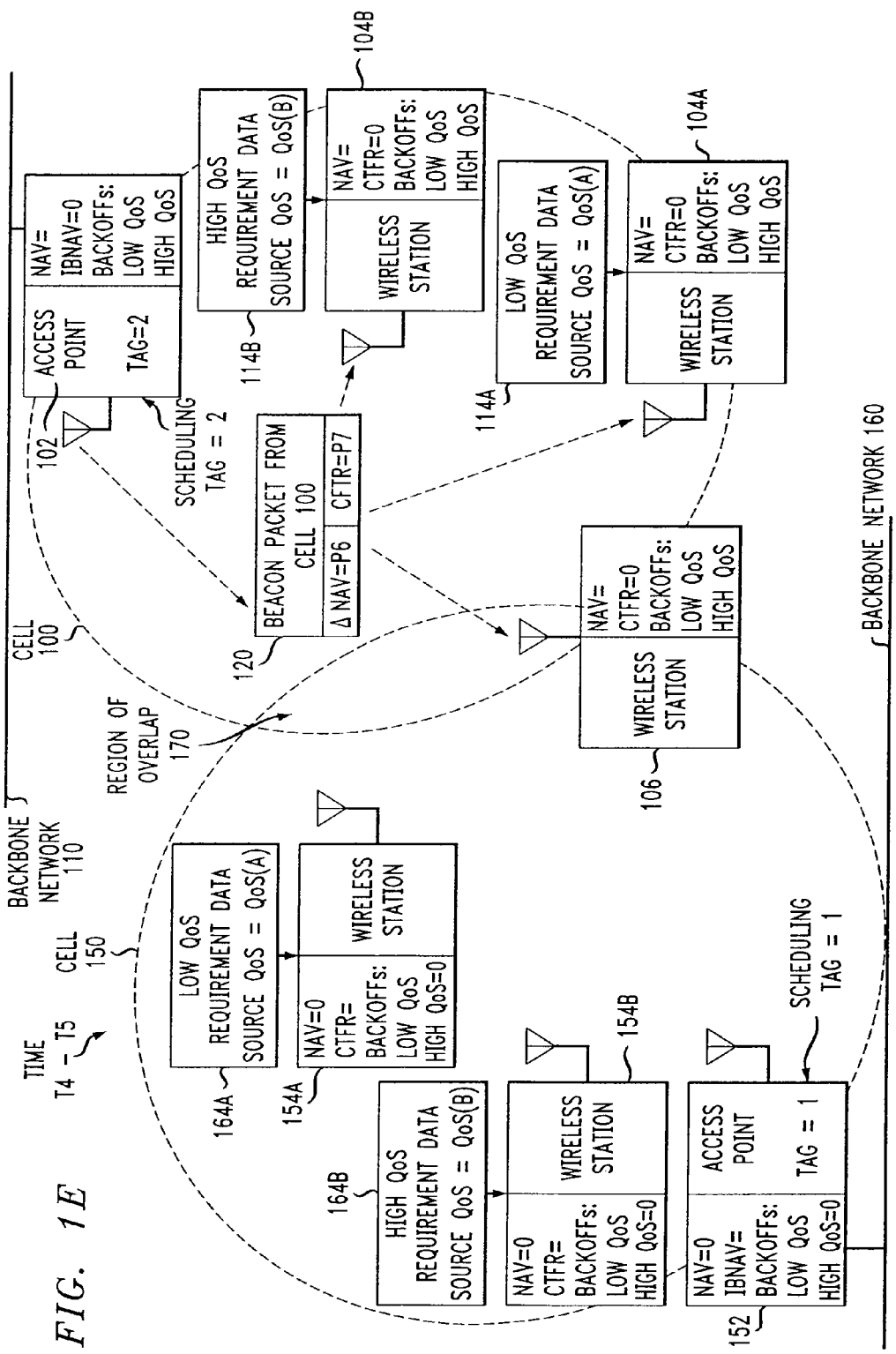
Figure 1F:
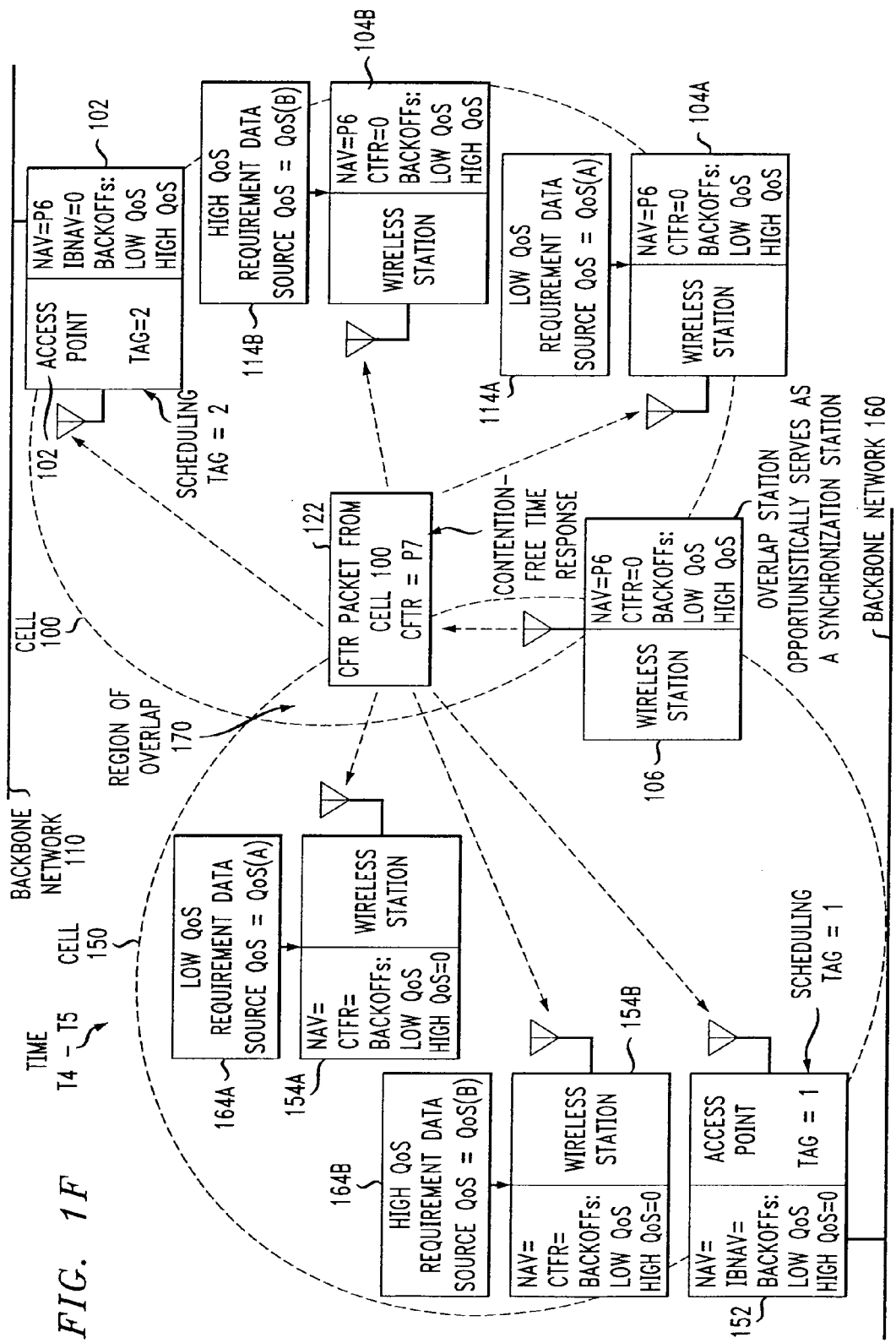

The method similarly assigns to the second access point 102 station in the second wireless LAN cell 100 that overlaps the first sell 150, a second contention-free period value CFTR=P7 longer than the first contention-free period value CFTR=P4. FIG. 1E shows the second access point 102 in the cell 100 transmitting its beacon packet 120 including its contention-free period values of NAV (P6) and IBNAV (P7), to the member stations 104A (with a low QoS requirement 114A), 104B (with a high QoS requirement 114B) and 106 in the cell 100 during the period from T4 to T5. FIG. 1F shows that each station, including the overlap station 106, that receives the second beacon packet 120, immediately responds by retransmitting a second contention-free time response (CFTR) packet 122 that contains a copy of the second inter-cell contention-free period value P7 during the period from T4 to T5

Figure 1G:
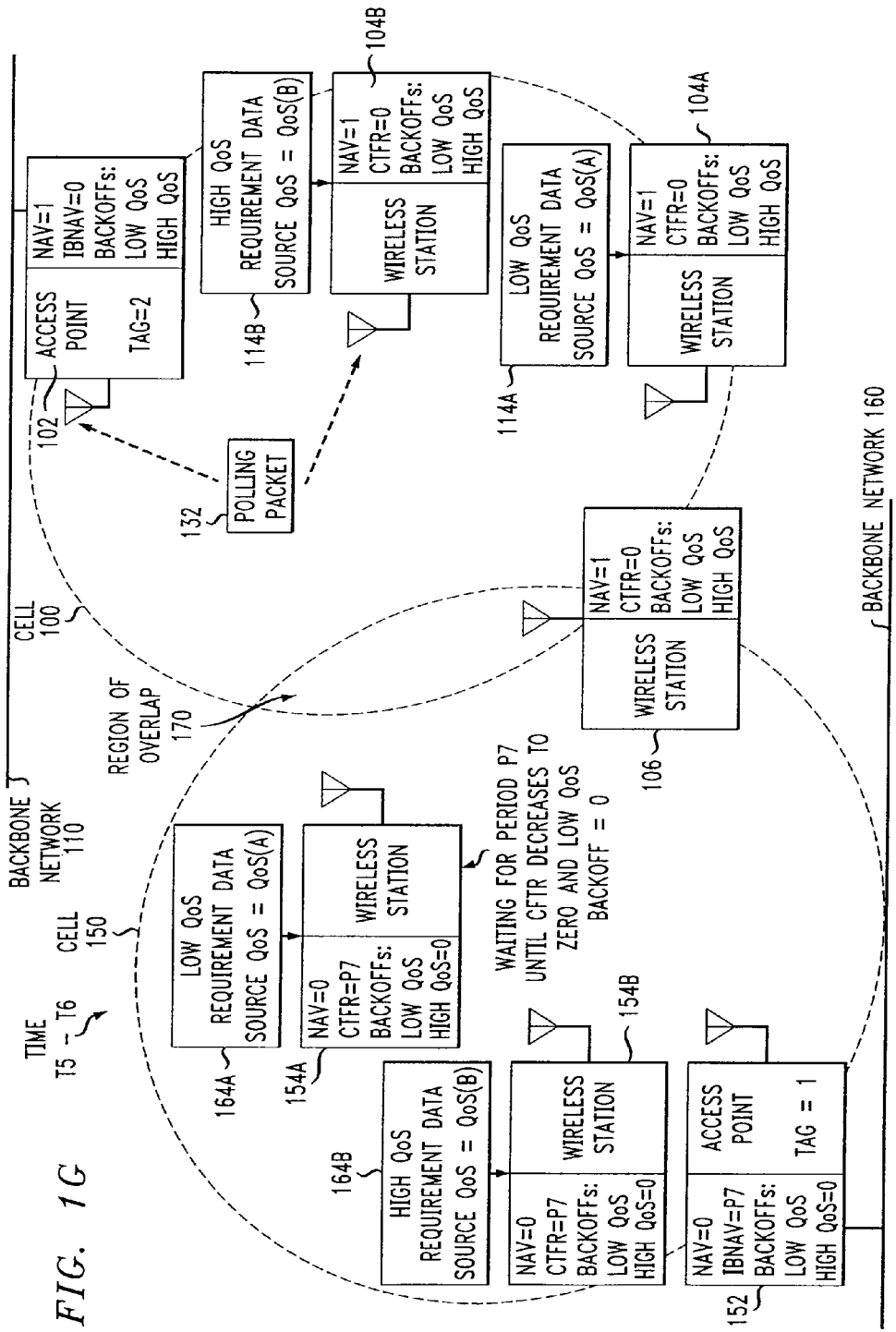

FIG. 1G shows the point coordinator in access point 102 of cell 100 controlling the contention-free period within cell 100 using the polling packet 132 during the period from T5 to T6.

Figure 1H:
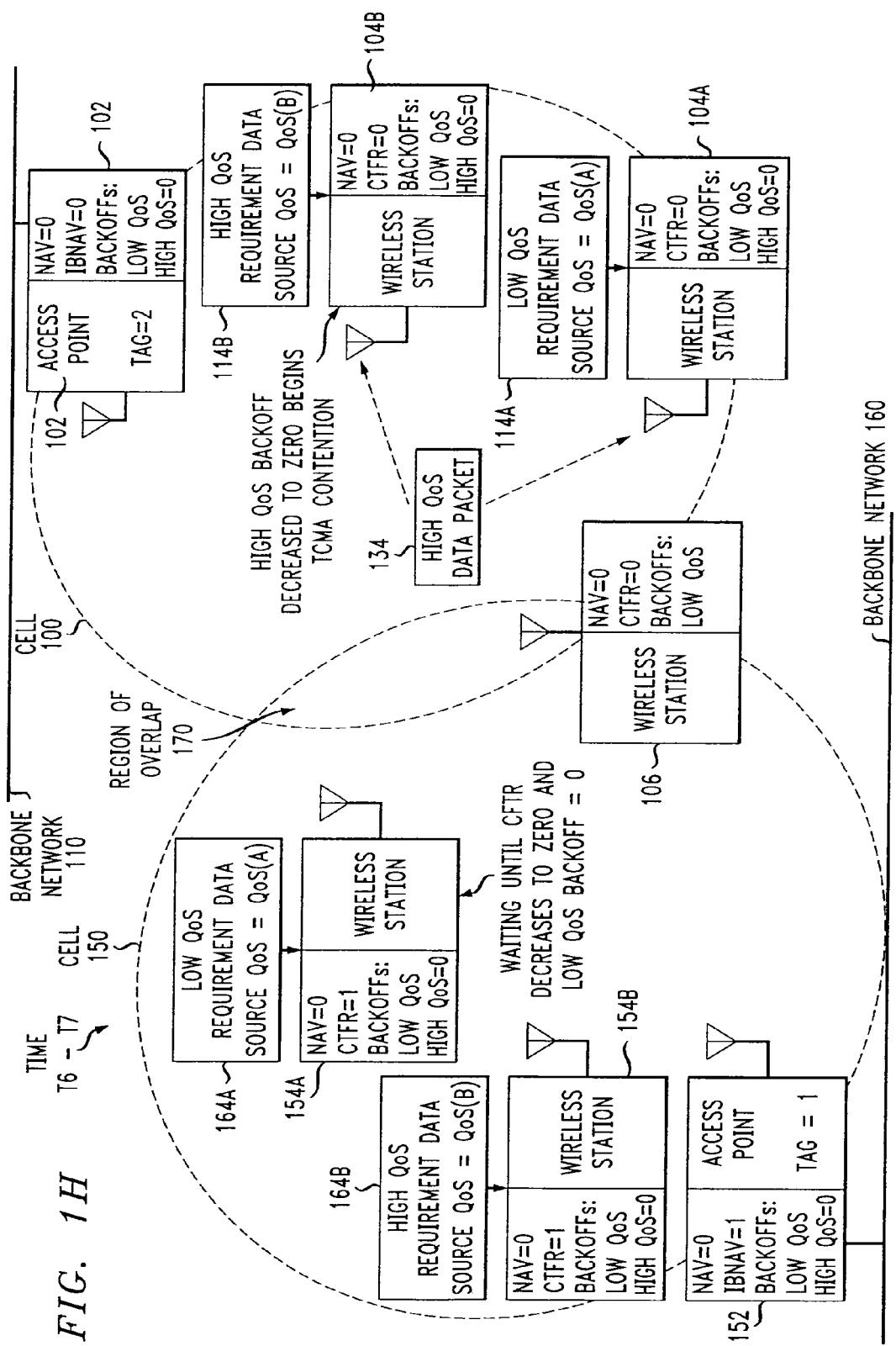
Figure 1I:
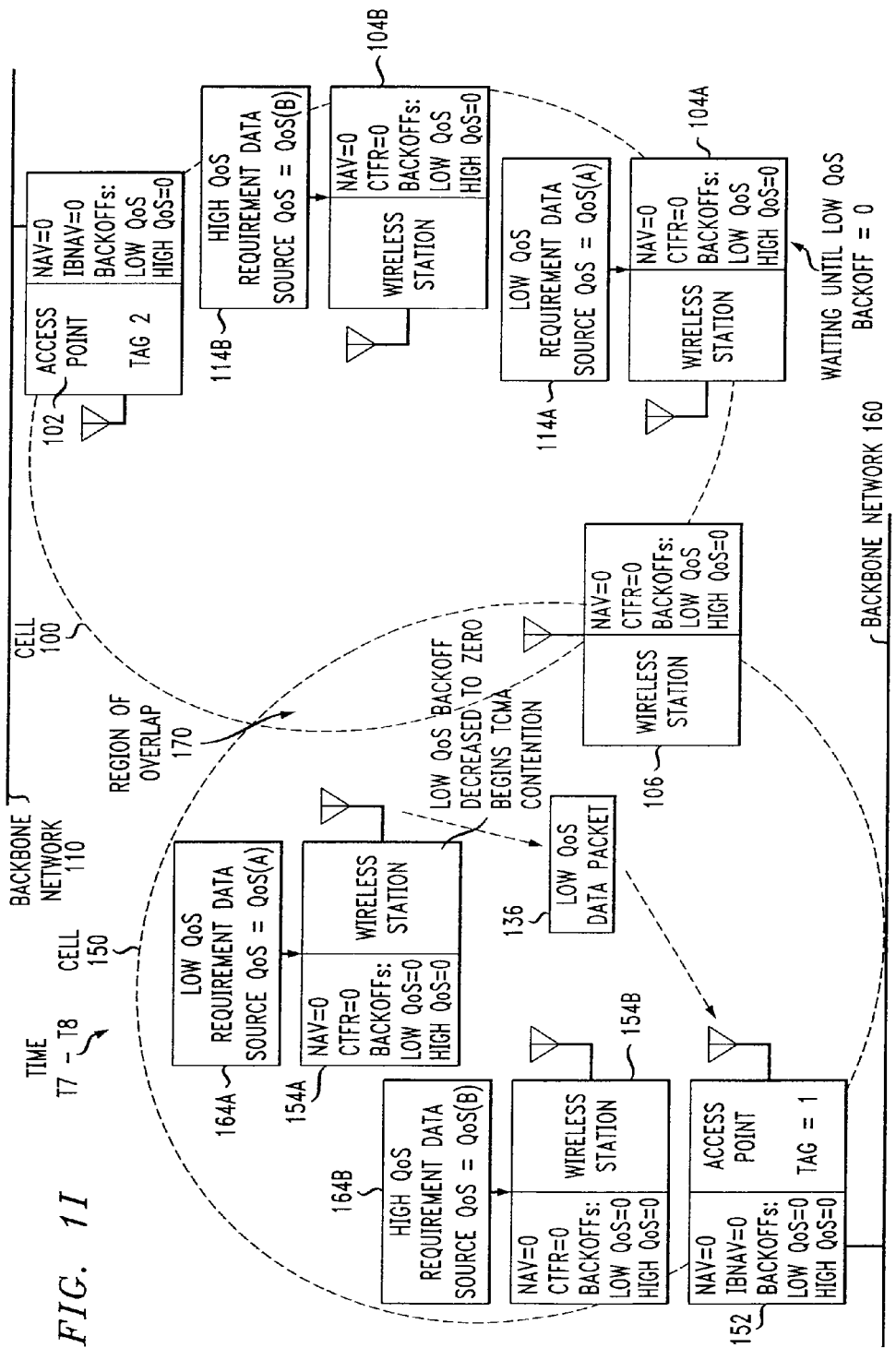
Figure 1J:
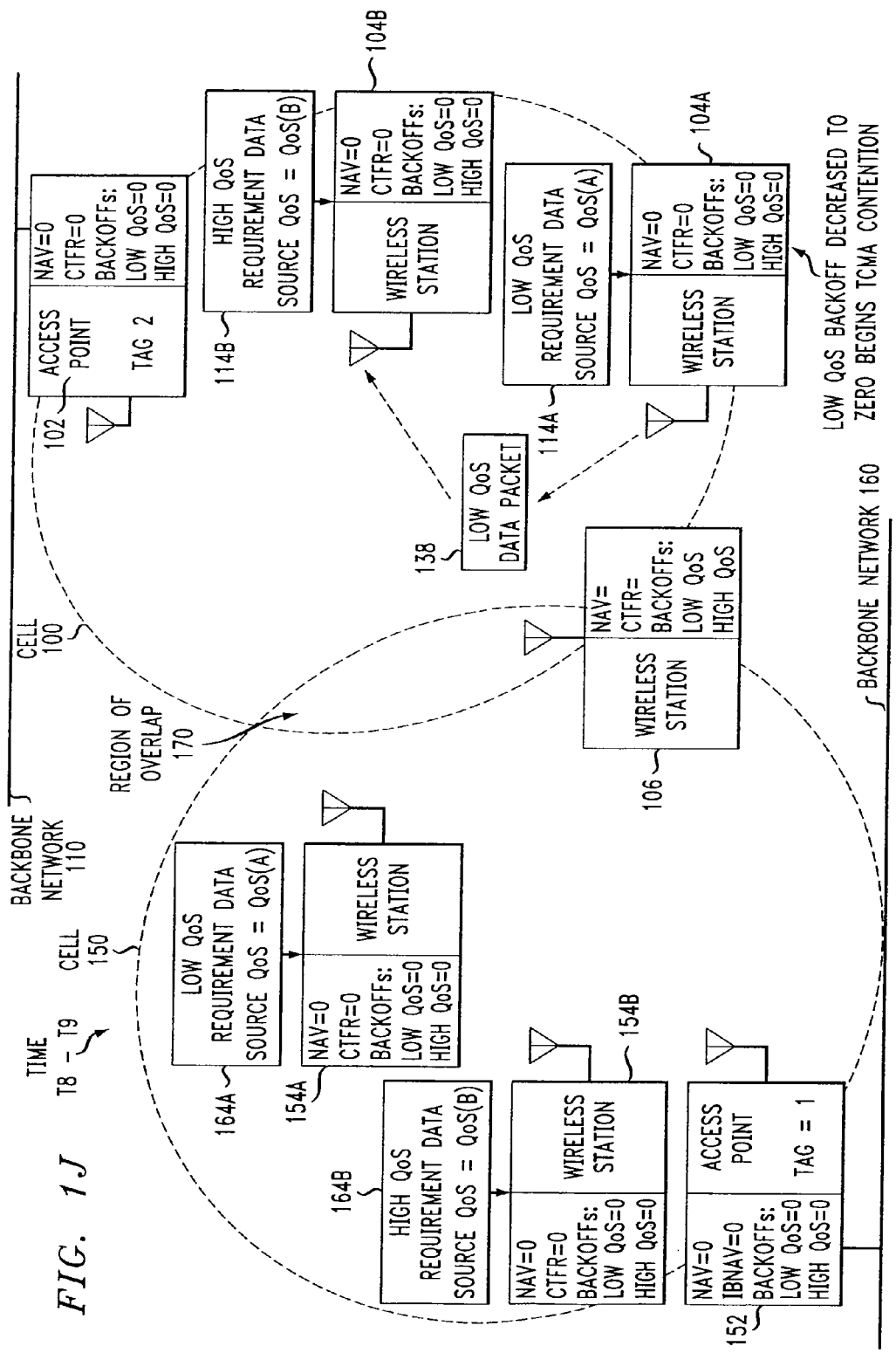

The method uses the Tiered Contention Multiple Access (TCMA) protocol to assign to second member stations in the second cell 100, a second shorter backoff value for high QoS data and a second longer backoff value for lower QoS data. FIG. 1H shows the station 104B in the cell 100, having a high QoS requirement 114B, decreasing its High QoS backoff period to zero and beginning TCMA contention to transmit its high QoS data packet 134 during the period from T6 to T7. FIG. 1I shows the first member stations 154A and 154B in the first cell 150 waiting for the count down of their NAVs, to begin the TCMA protocol of counting down the first longer backoff for low QoS data and then transmitting first low QoS data 136 during the period from T7 to T8. FIG. 1J shows the second member stations 104A, 104B, and 106 are waiting for the TCMA protocol of counting down the second longer backoff for lower QoS data before transmitting the second lower QoS data 138 during the period from T8 to T9.

The first and second cells are considered to be overlapped when one or more stations in the first cell can inadvertently receive packets from member stations or the access point of the other cell. The invention reduces the interference between the overlapped cells by coordinating the timing of their respective transmissions, while maintaining the TCMA protocol's preference for the transmission of high QoS data over low QoS data in each respective cell.

During the operation of two overlapped cells, the method in FIG. 1A transmits a first beacon packet 124 including the intra-cell contention-free period value (the increment to the NAV) and inter-cell contention-free period value (the CFTR), from the first access point 152 to the first member stations 154B and 154A in the first cell 150. The beacon packet is received by the member stations of the first cell and inadvertently by at least one overlapped member station 106 of the second cell 100. Each member station 154B and 154A in the first cell increments its NAV with the intra-cell contention-free period value P3 and stores the inter-cell contention-free period value P4 as the CFTR.

In accordance with the invention, each station that receives the first beacon packet 124, immediately responds by transmitting a first contention-free time response (CFTR) packet 126 in FIG. 1B that contains a copy of the inter-cell contention-free period P4 value (CFTR). A CFTR packet 126 is transmitted from the first member stations 154B and 154A in the first cell 150 and also by the overlapped member stations 106 of the second cell 100. The effect of the transmission of CFTR packets 126 from member stations 106 in the second cell 100 is to alert the second access point 102 and the second member stations 104A and 104B in the second cell 100, that the medium has been seized by the first access point 152 in the first cell 150. When the second access point 102 in the second cell 100 receives the CFTR packet 126 it stores the a copy of the inter-cell contention-free period value P4 as the IBNAV.

Similar to a station's Network Allocation Vector (NAV), an IBNAV is set at the access point to indicate the time the medium will be free again. Also similar to the NAV, the IBNAV is decremented with each succeeding slot, similar to the decrementing of other backoff times. When the second access point receives a new IBNAV representing the first cell's contention-free period value, then the second access point must respect the IBNAV value and delay transmitting its beacon packet and the exchange of other packets in the second cell until the expiration of the received, IBNAV.

Later, as shown in FIG. 1E, when the second access point 102 transmits its second beacon packet 120 including its second contention-free period values of NAV (P6) and IBNAV (P7), to the second member stations 104A, 104B and 106 in the second cell 100, each station that receives the second beacon packet, immediately responds by transmitting a second contention-free time response (CFTR) packet 122 in FIG. 1F, that contains a copy of the second inter-cell contention-free period value P7. A CFTR packet 122 is transmitted from the second member stations 104A, 104B and overlapped station 106 in the second cell and also by the overlapped member stations of the first cell. The effect of the transmission of CFTR packets from overlapped member station 106 is to alert the first access point 152 and the first member stations 145A and 154B in the first cell 150, that the medium has been seized by the second access point 102 in the second cell 100. When the first access point 152 in the first cell 150 receives the CFTR packet 122 it stores the a copy of the second inter-cell contention-free period value P7 as an IBNAV, to indicate the time the medium will be free again. The IBNAV is decremented with each succeeding slot, similar to the decrementing of other backoff times.

The second member stations 104A, 104B, and 106 in the second cell 100 wait for completion of the count down of their NAVs to begin the TCMA protocol of counting down the second shorter backoff for high QoS data and then transmitting second high QoS data packets, as shown in FIGS. 1G and 1H.

Meanwhile, the first access point 152 in the first cell 150 waits for completion of the count down of the second inter-cell contention-free period P7 in its IBNAV in FIGS. 1G and 1H before starting the countdown of its own NAV for its own intra-cell contention-free period. The first member stations 154A and 154B in the first cell 150 wait for the count down of their NAVs, to begin the TCMA protocol of counting down the first longer backoff for low QoS data and then transmitting first low QoS data in FIG. 1I.

Meanwhile the second member stations 104A, 104B, and 106 are waiting for the TCMA protocol of counting down the second longer backoff for lower QoS data before transmitting the second lower QoS data 138 in FIG. 1J.

In this manner, interference in a medium between overlapping wireless LAN cells is reduced.

DETAILED DESCRIPTION OF THE INVENTION

TCMA can accommodate co-existing Extended Distributed Coordination Function (E-DCF) and centralized access protocols. In order to ensure that the centralized access protocol operating under Hybrid Coordination Function (HCF) is assigned top priority access, it must have the shortest arbitration time. Its arbitration time is determined by considering two additional requirements: uninterrupted control of the channel for the duration of the contention-free period, and backward compatibility.

Uninterrupted Contention-Free Channel Control

The channel must remain under the control of the centralized access protocol until the contention-free period is complete once it has been seized by the centralized access protocol. For this, it is sufficient that the maximum spacing between consecutive transmissions exchanged in the centralized access protocol, referred to as the central coordination time (CCT), be shorter than the time the channel must be idle before a station attempts a contention-based transmission following the end of a busy-channel time interval. The centralized access protocol has a CCT equal to the Priority Interframe Space (PIFS). Hence, no station may access the channel by contention, using either the distributed coordination function (DCF) or Extended-DCF (E-DCF) access procedure, before an idle period of length of the DCF Interframe Space (DIFS) equaling PIFS+1 (slot time) following the end of a busy-channel time interval. This requirement is met by DCF. For E-DCF, it would be sufficient for the Urgency Arbitration Time (UAT) of a class j, $UAT_j$, to be greater than PIFS for all classes j>1.

Backward Compatibility

Backward compatibility relates to the priority treatment of traffic handled by enhanced stations (ESTAs) as compared to legacy stations (STAs). In addition to traffic class differentiation, the ESTAs must provide certain traffic classes with higher or equal priority access than that provided by the STAs. That means that certain traffic classes should be assigned a shorter arbitration times than DIFS, the de facto arbitration time of legacy stations.

Because the time in which the "clear channel assessment" (CCA) function can be completed is set at the minimum attainable for the IEEE 802.11 physical layer (PHY) specification, the arbitration times of any two classes of different priority would have to be separated by at least one "time slot". This requirement implies that the highest priority traffic class would be required to have an arbitration time equal to DIFS−1(slot time)=PIFS.

Though an arbitration time of PIFS appears to fail meeting the requirement for uninterrupted control of the channel during the contention-free period, it is possible for an ESTA to access the channel by E-DCF using an arbitration time of PIFS and, at the same time, allow priority access to the centralized access protocol at PIFS. This is achieved as follows. Contention-based transmission is restricted to occur after a DIFS idle period following the end of a busy channel period by ensuring that the backoff value of such stations is drawn from a random distribution with lower bound that is at least 1. Given that all backlogged stations resume backoff countdown after a busy-channel interval with a residual backoff of at least 1, an ESTA will attempt transmission following completion of the busy interval only after an idle period equal to PIFS+1 (slot time)=DIFS. This enables the centralized access protocol to maintain control of the channel without colliding with contention-based transmissions by ESTAs attempting to access the channel using E-DCF.

To see that the residual backoff value of a backlogged station will be greater than or equal to 1 whenever countdown is resumed at the end of a busy channel period, consider a station with a backoff value m>0. The station will decrease its residual backoff value by 1 following each time slot during which the channel remains idle. If m reaches 0 before countdown is interrupted by a transmission, the station will attempt transmission. The transmission will either fail, leading to a new backoff being drawn, or succeed. Therefore, countdown will be resumed after the busy-channel period ends, only with a residual backoff of 1 or greater. Consequently, if the smallest random backoff that can be drawn is 1 or greater, an ESTA will always wait for at least a DIFS idle interval following a busy period before it attempts transmission.

Only one class can be derived with priority above legacy through differentiation by arbitration time alone, by using the arbitration time of PIFS. Multiple classes with that priority can be obtained by differentiation through other parameters, such as the parameters of the backoff time distribution; e.g. the contention window size. For all the classes so derived, a DIFS idle period will follow a busy channel interval before the ESTA seizes the channel if the restriction is imposed that the backoff value of such stations be drawn from a random distribution with lower bound of at least 1.

Because PIFS is shorter than DIFS, the traffic classes with arbitration time equal to PIFS will have higher access priority than the traffic classes with arbitration time equal to DIFS. As seen in FIG. 1, which depicts the tiered contention mechanism, a station cannot engage in backoff countdown until the completion of an idle period of length equal to its arbitration time. Therefore, a legacy station will be unable to resume backoff countdown at the end of a busy-channel interval, if an ESTA with arbitration time of PIFS has a residual backoff of 1. Moreover, a legacy station will be unable to transmit until all higher-priority ESTAs with residual backoff of 1 have transmitted. Only legacy stations that draw a backoff value of 0 will transmit after a DIFS idle period, thus competing for the channel with the higher priority stations. This occurs only with a probability less than 3 percent, since the probability of drawing a random backoff of 0 from the range [0,31] is equal to 1/32.

Top Priority for the Centralized Access Protocol

For the centralized access protocol to enjoy the highest priority access, it must have an arbitration time shorter than PIFS by at least a time slot; that is, its arbitration time must equal PIFS−1 (slot time)=the Short Interframe Space (SIFS). As in the case of the highest traffic priority classes for ESTAs accessing the channel by E-DCF, the random backoff values for the beacon of the centralized access protocol must be drawn from a range with a lower bound of at least 1. Using the same reasoning as above, the centralized access protocol will not transmit before an idle period less than PIFS=SIFS+1 (slot time), thus respecting the inter-frame spacing requirement for a SIFS idle period within frame exchange sequences. Consequently, the shorter arbitration time assigned to the centralized access protocol ensures that it accesses the channel with higher priority than any station attempting contention-based access through E-DCF, while at the same time respecting the SIFS spacing requirement.

It should be noted that while collisions are prevented between frame exchanges during the contention-free period, collisions are possible both between the beacons of centralized access protocols of different BSSs located within interfering range [having coverage overlap], and between the beacon of a centralized access protocol and stations accessing the channel by contention using E-DCF. The probability of such collisions is low because higher priority nodes with residual backoff value m equal to 1 always seize the channel before lower priority nodes. Inter-access point collisions are resolved through the backoff procedure of TCMA.

Inter-Access Point Contention

Potential collisions between BSSs engaged in centralized access can be averted or resolved by a backoff procedure. The complication arising here is that a random backoff delay could result in idle periods longer periods than the SIFS+1 (slot time)=PIFS, which is what ensures priority access to the centralized protocol over E-DCF traffic contention-based traffic. Hence, the collisions with contention-based traffic would occur. Using short backoff windows in order to avoid this problem would increase the collisions experienced. In accordance with the invention, deterministically set backoff delays are used, which tend to reduce the length of the idle periods.

Another aspect of inter-BSS interference that affects the performance of centralized protocols adversely is the possible interruption with a collision of what starts as an interference-free poll/response exchange between the access point and its associated stations. The possibility of coincident or overlapping contention-free periods between neighboring BSSs is eliminated through the use of an "interference sensing" method employing a new frame.

Deterministic Backoff Procedure for the Centralized Access Protocol

A modified backoff procedure is pursued for the beacons of the centralized access protocols. A backoff counter is employed in the same way as in TCMA. But while the backoff delay in TCMA is selected randomly from a contention window, in the case of the centralized access protocol beacons, the backoff value is set deterministically.

Scheduling of packet transmission occurs once per frame, at the beginning of the frame Only the packets queued at the start of a frame will be transmitted in that frame. It is assumed that BSSs are synchronized. A means for achieving such synchronization is through the exchange of messages relayed by boundary stations [stations in the overlapping regions of neighboring BSSs].

Figure 2:
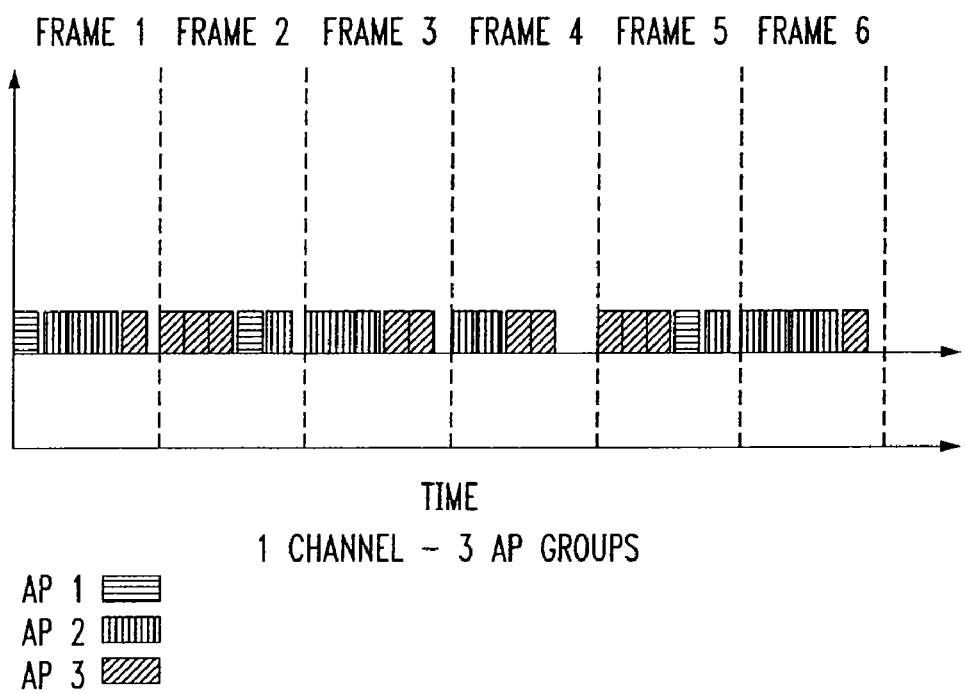
FIG. 2 illustrates the ordering of transmissions from three groups of BSSs.

The backoff delay is selected through a mechanism called "tag scheduling". Tags, which are ordinal labels, are assigned to different BSSs. BSSs that do not interfere with one another may be assigned the same tag, while BSSs with the potential to interfere with one another must receive different tags. For each frame, the tags are ordered in a way that is known a priori. This order represents the sequence in which the BSS with a given tag will access the channel in that frame. The backoff delay increases with the rank of the "tag" that has been assigned to the BSS for the current frame, as tags are permuted to give each group of BSS with the same tag a fair chance at the channel. For instance, a cyclic permutation for three tags, t=1, 2, 3, would give the following ordering: 1, 2, 3 for the first frame, 3, 1, 2 next, and then 2, 3, 1. One could also use other permutation mechanisms that are adaptive to traffic conditions and traffic priorities. The difference in the backoff delays corresponding to two consecutive tags is one time slot. FIG. 2 illustrates the ordering of transmissions from three groups of BSSs.

Figure 3:
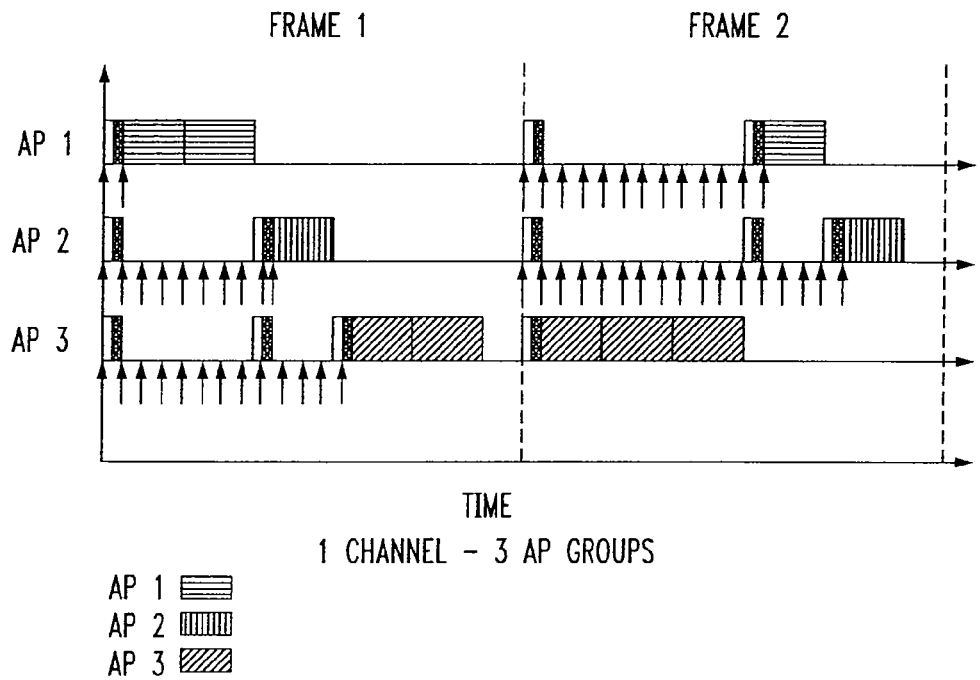
FIG. 3 illustrates how three interfering BSSs share the same channel for two consecutive frames.

A backoff counter is associated with each backoff delay. It is decreased according to the rules of TCMA using the arbitration time of Short Interframe Space (SIFS) as described in the preceding section. That is, once the channel is idle for a time interval equal to SIFS, the backoff counter associated with the centralized protocol of the BSS is decreased by 1 for each slot time the channel is idle. Access attempt occurs when the backoff counter expires. The minimum backoff value associated with the highest-ranking tag is 1. FIG. 3 illustrates how three interfering BSSs share the same channel for two consecutive frames. The tags assigned in each of the two frames are (1, 2), (2, 3), and (3, 1) for the three BSSs, respectively. The backoff delays for the three tags are 1, 2, and 3 time slots.

When the channel is seized by the centralized protocol of a BSS, it engages in the polling and transmission functions for a time interval, known as the contention-free period. Once the channel has been successfully accessed that way, protection by the Network Allocation Vector (NAV) prevents interference from contention based traffic originating within that BSS. Avoidance of interference from neighboring BSS is discussed below. A maximum limit is imposed on the reservation length in order to even out the load on the channel from different BSSs and allow sufficient channel time for contention-based traffic.

It is important to note the advantage of using deterministic backoff delays, versus random. Assuming an efficient (i.e., compact) tag re-use plan, deterministic backoff delays increase the likelihood that a beacon will occur precisely after an idle period of length SIFS+1=PIFS. This will enable the centralized protocol to gain access to the channel, as a higher priority class should, before contention-based traffic can access the channel at DIFS=PIFS+1. Using a random backoff delay instead might impose a longer idle period and hence, give rise to collisions with contention-based traffic. Use of short backoff windows to avoid this problem would be ill advised, since that would result in collision between the various BSS beacons.

Though the backoff delays are set in a deterministic manner, there are no guarantees that collisions will always be avoided. Unless the duration of the contention-free period is the same for all BSSs, there is the possibility that interfering BSSs will attempt to access the channel at once. In case of such a collision, the backoff procedure starts again with the backoff delay associated with the tag assigned to the BSS, decreased by 1, and can be repeated until expiration of the frame. At the start of a new frame, a new tag is assigned to the BSS according to the pre-specified sequence, and the deferral time interval associated with the new tag is used.

Collisions are also possible if tag assignments are imperfect (interfering BSSs are assigned the same tag). In the event of such a collision, transmission should be retried with random backoff. In order to deal with either type of collision, resolution occurs by drawing a random delay from a contention window size that increases with the deterministic backoff delay associated with the tag in that frame. Though random backoff is used in this event, starting with deterministic backoff helps reduce contention time.

In a hybrid scenario, random backoff can be combined with tag scheduling. Instead of using backoff delays linked to the rank of a tag in a frame, the contention window size from which the backoff delay is drawn would increase with decreasing rank. The advantage of such an approach is to relax the restrictions on re-use by allowing the possibility that potentially interfering stations will be assigned the same tag. The disadvantage is that the Inter-BSS Contention Period (IBCP) time needed to eliminate contention by E-DCF traffic increases.

Interference Sensing

Interference sensing is the mechanism by which the occupancy status of a channel is determined. The access point only needs to know of channel activity in interfering BSSs. The best interference sensing mechanism is one that ensures that the channel is not used simultaneously by potentially interfering users. This involves listening to the channel by both the access point and stations. If the access point alone checks whether the channel is idle, the result does not convey adequate information on the potential for interference at a receiving station, nor does it address the problem of interference caused to others by the transmission, as an access point may not be able to hear transmissions from its neighboring access points, yet there is potential of interference to stations on the boundary of neighboring BSSs. Stations must detect neighboring BSS beacons and forward the information to their associated access point. However, transmission of this information by a station would cause interference within the neighboring BSS.

In order to enable communication of channel occupancy information to neighboring access points, the invention includes the following mechanism. When a beacon packet is transmitted, and before transmission of any other data or polling packets, all stations hearing the beacon will respond by sending a frame, the contention-free time response (CFTR), that will contain the duration of the contention-free period found in the beacon. An access point in neighboring BSSs, or stations attempting contention-based channel access, that receive this message from a station in the BSS overlapping region are thus alerted that the channel has been seized by a BSS. Similar to a station's Network Allocation Vector (NAV), an Inter-Cell Network Allocation Vector, also referred to herein as an inter-BSS NAV (IBNAV), is set at the access point, accordingly, indicating the time the channel will be free again. Unless the IBNAV is reset, the access point will decrease its backoff value only after the expiration of the IBNAV, according to the backoff countdown rules.

Alternatively, if beacons are sent at fixed time increments, receipt of the contention-free time response (CFTR) frame would suffice to extend the IBNAV. The alternative would be convenient in order to obviate the need for full decoding of the CFTR frame. It is necessary, however, that the frame type of CFTR be recognizable.

Contention by E-DCF traffic while various interfering BSSs attempt to initiate their contention-free period can be lessened by adjusting the session length used to update the NAV and IBNAV. The contention-free period length is increased by a period Inter-BSS Contention Period (IBCP) during which the access points only will attempt access of the channel using the backoff procedure, while ESTAs wait for its expiration before attempting transmission. This mechanism can reduce the contention seen by the centralized protocols when employing either type of backoff delay, random or deterministic. With deterministic backoff delays, IBCP is set equal to the longest residual backoff delay possible, which is T(slot time), where T is the number of different tags. Given reasonable re-use of the tags, the channel time devoted to the IBCP would be less with deterministic backoff delays, as compared to the random.

QoS Management

A QoS-capable centralized protocol will have traffic with different time delay requirements queued in different priority buffers. Delay-sensitive traffic will be sent first, followed by traffic with lower priority. Tag scheduling is used again, but now there are two or more backoff values associated with each tag, a shorter value for the higher priority traffic and longer ones for lower priority. A BSS will transmit its top priority packets first, as described before. Once the top priority traffic has been transmitted, there would be further delay before the BSS would attempt to transmit lower priority traffic in order to give neighboring BSSs a chance to transmit their top priority packets. As long as any of the deferral time intervals for low-priority traffic is longer than the deferral time intervals for higher priority traffic of any tag, in general all neighboring BSSs would have a chance to transmit all pending top-priority packets before any lower-priority packets are transmitted.

Figure 4:
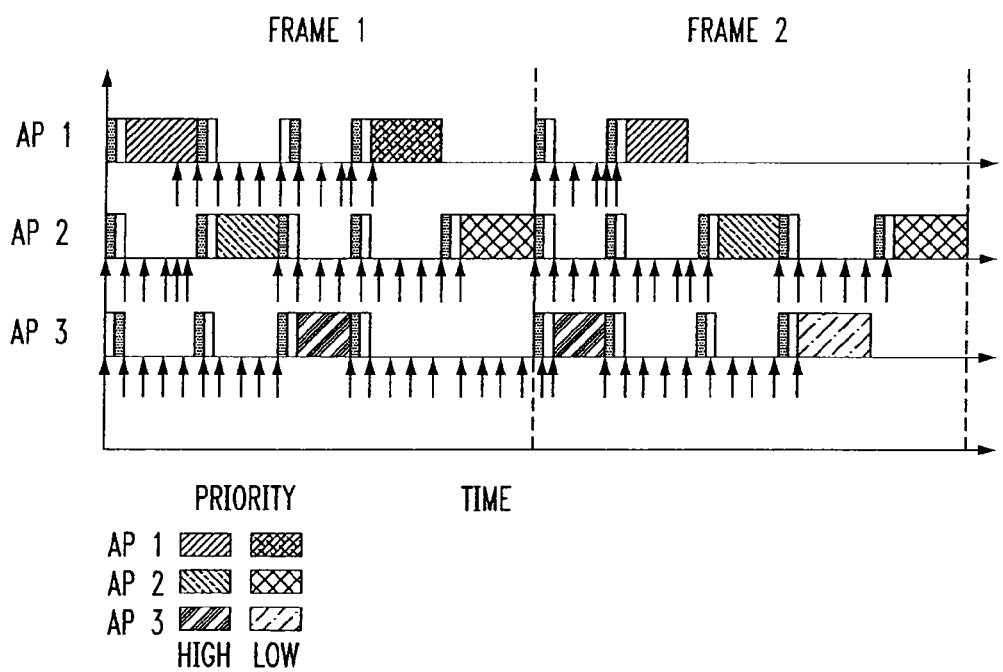
FIG. 4 illustrates how three interfering BSSs, each with two types of traffic of different priorities, share the same channel in two consecutive frames.

FIG. 4 illustrates how three interfering BSSs, each with two types of traffic of different priorities, share the same channel in two consecutive frames. As before, the tags assigned in each of the two frames are (1, 2), (2, 3), and (3, 1) for the three BSSs, respectively. The deferral times for the top priority traffic are 1, 2, and 3 time slots for tags 1, 2, and 3, respectively. The deferral times for the higher priority traffic are 4, 5, and 6 time slots for tags 1, 2, and 3, respectively.

Tag Assignments

A requirement in assigning tags to BSS is that distinct tags must be given to user entities with potential to interfere. This is not a difficult requirement to meet. In the absence of any information, a different tag could be assigned to each user entity. In that case, non-interfering cells will use the channel simultaneously even though they have different tags. Interference sensing will enable reuse of the channel by non-interfering BSSs that have been assigned different tags.

There are advantages, however, in reducing the number of different tags. For instance, if the interference relationships between user entities are known, it is advantageous to assign the same tag to non-interfering BSS, and thus have a smaller number of tags. The utilization of bandwidth, and hence total throughput, would be greater as shorter deferral time intervals leave more of the frame time available for transmission. Moreover, an efficient (i.e., compact) tag re-use plan will decrease the likelihood of contention between the centralized protocol beacons of interfering BSSs contenting for access and E-DCF traffic. This problem is mitigated by using the IBCP time in the IBNAV, but re-use will reduce the length of this time.

Figure 5A:
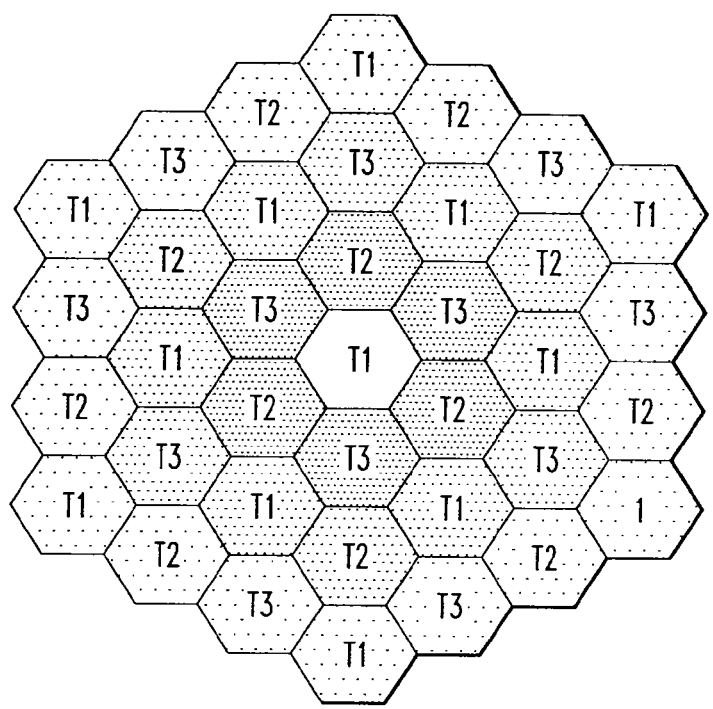
FIG. 5 illustrates the possible re-use of tags.
Figure 5B:
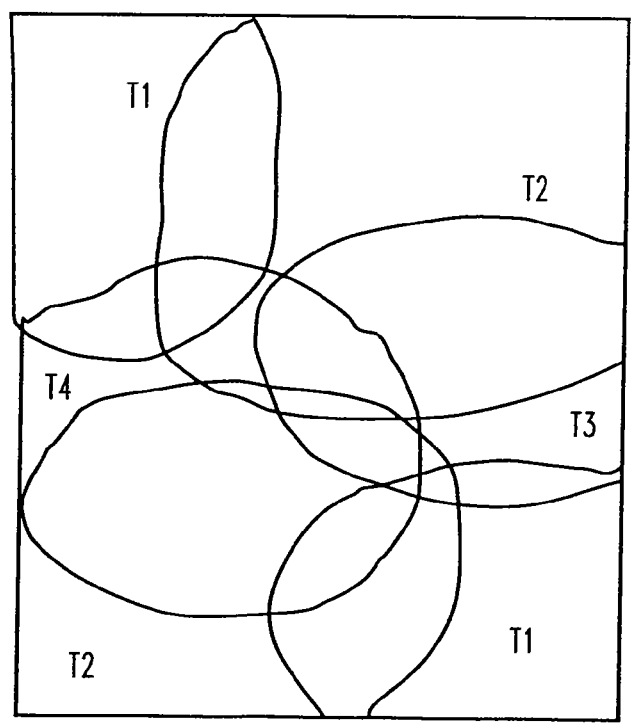

The assignment of tags to cells can be done without knowledge of the location of the access points and/or the stations. Tag assignment, like channel selection can be done at the time of installation. And again, like dynamic channel selection, it can be selected by the access point dynamically. RF planning, which processes signal-strength measurements can establish re-use groups and thus reduce the required number of tags. FIG. 5, which includes FIGS. 5(a) and 5(b), illustrates the possible re-use of tags. In FIG. 5(a), the access points are located at ideal spots on a hexagonal grid to achieve a regular tessellating pattern. In FIG. 5(b), the access points have been placed as convenient and tags are assigned to avoid overlap. Imperfect tag assignments will lead to collisions between the access points, but such collisions can be resolved.

To recap, arbitration times have been assigned to a centralized access protocol that co-exists with ESTAs accessing the channel through E-DCF. The centralized access protocol has the top priority, while E-DCF can offer traffic classes with priority access both above and below that provided by legacy stations using DCF.

Table 1 illustrates the parameter specification for K+1 different classes according to the requirements given above. The centralized access protocol is assigned the highest priority classification, and hence the shortest arbitration time. The top k−1 traffic classes for the E-DCF have priority above legacy but below the centralized access protocol; they achieve differentiation through the variation of the contention window size as well as other parameters. E-DCF traffic classes with priority above legacy have a lower bound, rLower, of the distribution from which backoff values are drawn that is equal to 1 or greater. Differentiation for classes with priority below legacy is achieved by increasing arbitration times; the lower bound of the random backoff distribution can be 0.

BSSs within interfering range of one another compete for the channel through a deterministic backoff procedure employing tag scheduling, which rotates the backoff value for fairness among potentially interfering BSS. Re-use of a tag is permitted in non-interfering BSS. Multiple queues with their own backoff values enable prioritization of different QoS traffic classes Contention-Free Bursts In accordance with the invention, potential collisions between different BSSs engaged in centralized access can be averted/resolved by deterministic backoff delays, which avoid collisions between access points, and eliminate gaps between consecutive poll/response exchanges between the access point and its associated stations. These are referred to as contention-free bursts (CFBs).

Deterministic Backoff Procedure for the Centralized Access Protocol

A modified backoff procedure is pursued for the beacons of the centralized access protocols. A backoff counter is employed in the same way as in TCMA. But while the backoff delay in TCMA is selected randomly from a contention window, in the case of the centralized access protocol beacons, the backoff value is set deterministically to a fixed value Bkoff, at the end of its contention-free session. Post-backoff is turned on.

Figure 6:
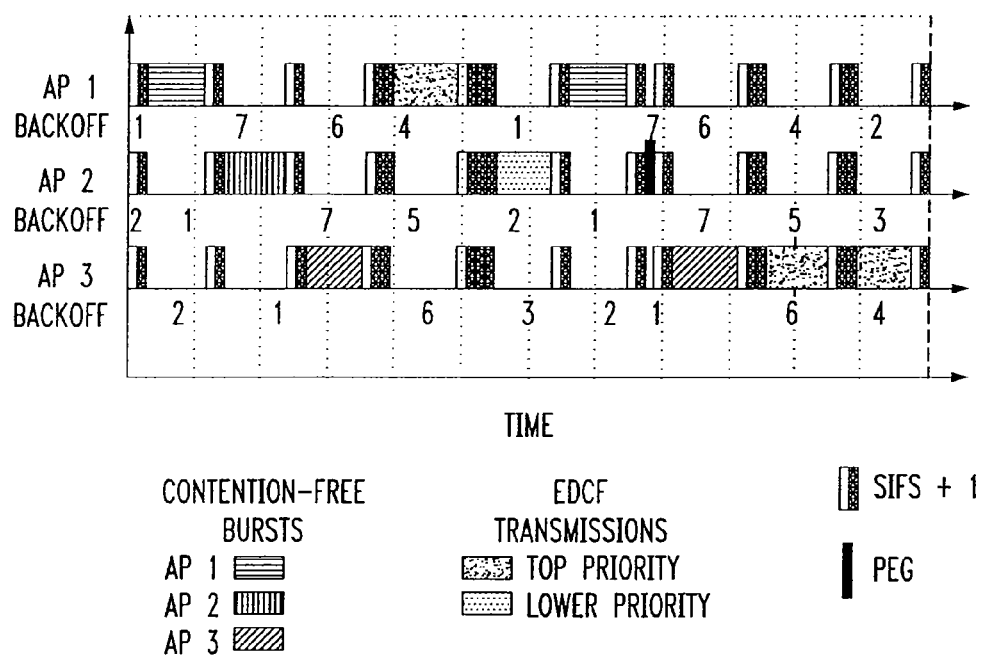
FIG. 6 illustrates the deterministic post-backoff.

The backoff counter is decreased according to the rules of TCMA using the arbitration time AIFS=SIFS as described in the preceding section. That is, once the channel is idle for a time interval equal to SIFS, the backoff counter associated with the centralized protocol of the BSS is decreased by 1 for each slot time the channel is idle. Access attempt occurs when the backoff counter expires. An HC will restart its backoff after completing its transmission. The deterministic post-backoff procedure is illustrated in FIG. 6.

When the channel is seized by the centralized protocol of a BSS, it engages in the polling and transmission functions for a time interval, known as the contention-free period. Once the channel has been successfully accessed that way, protection by the NAV prevents interference from contention based traffic originating in the BSS. Avoidance of interference from neighboring BSS is discussed below.

Non-Conflicting Contiguous Sequences of CFBs

As long as the value of Bkoff is greater than or equal to the maximum number of interfering BSS, it is possible for the contention-free periods of a cluster of neighboring/overlapping BSSs to repeat in the same order without a collision between them. CFBs of different BSSs can be made to follow one another in a contiguous sequence, thus maximizing access of the centralized protocol to the channel. This can be seen as follows.

Figure 7:
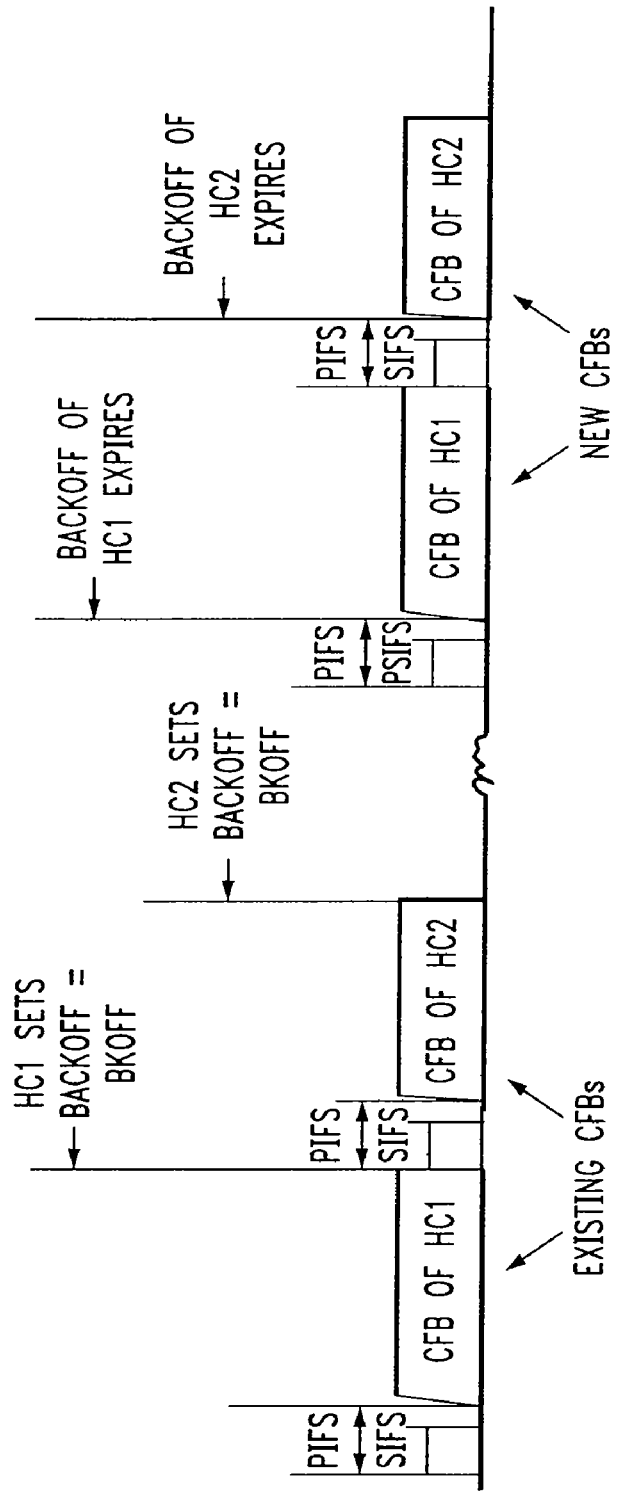
FIG. 7 shows the relationships of repeating sequences of CFBs.

Given a sequence of successful CFBs initiated by different BSSs, subsequent CFBs will not conflict because the follower's backoff counter always exceeds that of the leader by at least 1. If the previous CFBs were contiguous (that is, if consecutive CFBs were separated by idle gaps of length PIFS, the new CFBs will be also continuous because the follower's backoff delay exceeds that of the leader by exactly 1. Channel access attempts by E-DCF stations require an idle gap of length equal to DIFS or greater. FIG. 7 shows the relationships of repeating sequences of CFBs.

Figure 8:
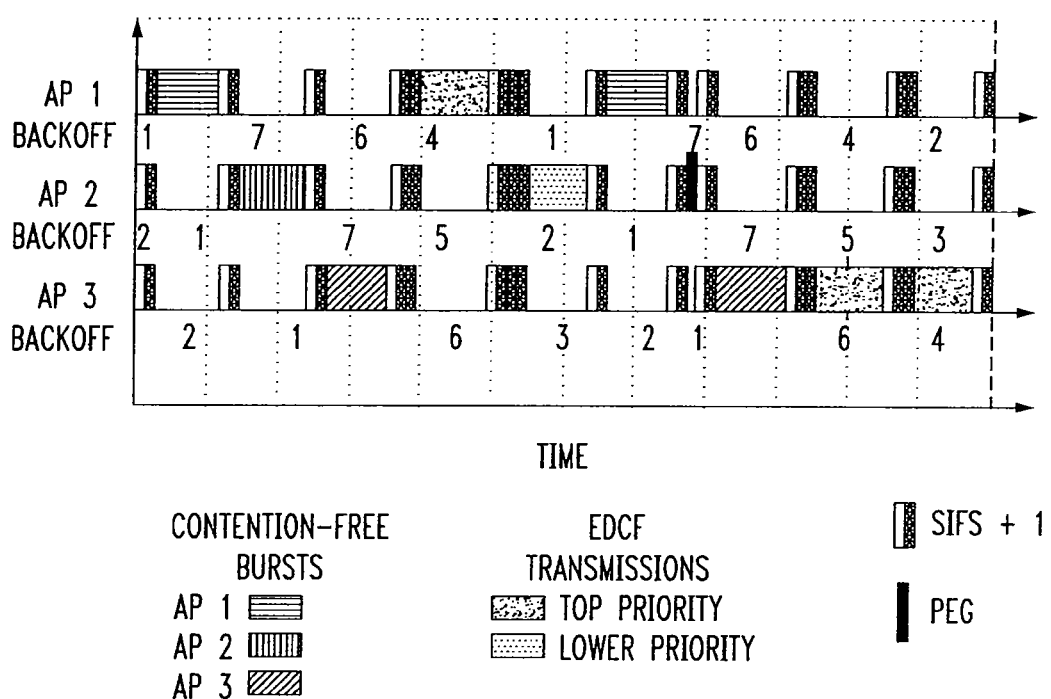
FIG. 8 illustrates the role of pegging in a sequence of CFBs by three overlapping access points.

In order to maintain contiguity, an HC that does not have any traffic to transmit when its backoff expires, it will transmit a short packet—a "peg"—and then engage in post-backoff. This way no gaps of length DIFS+1 are left idle until all HCs have completed one CFB per cycle, and restarted the backoff countdown procedure. E-DCF stations are thus prevented from seizing the channel until each BSS completes at least one CFB per cycle. FIG. 8 illustrates the role of pegging in a sequence of CFBs by three overlapping access points.

Figure 9:
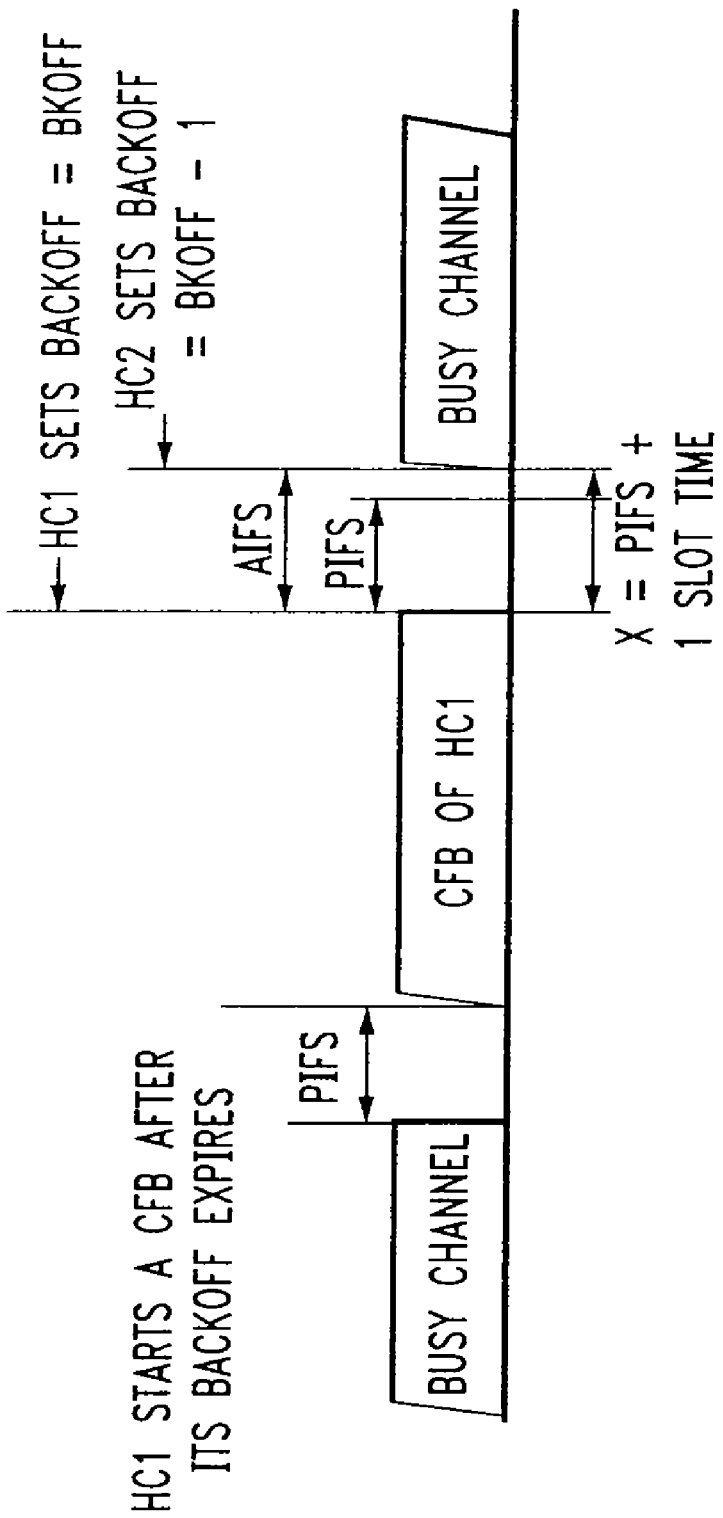
FIG. 9 illustrates the start-up procedure for a new access point, HC2, given an existing access point, HC1.

Finally it is shown how such a contiguous sequence can be constructed by analyzing how a new access point initiates its first CFB. Every time a new access point is installed, it must find its position in the repeating sequence of CFBs. The new access point listens to the channel for the desired cycle, trying to recognize the sequence. It listens for an "idle" PIFS following a busy channel. When that occurs, or after counting Bkoff time slots, whichever comes first, the new access point starts looking for the first idle longer than PIFS, which signifies the end of the sequence of CFBs. As long as the Bkoff is greater than the number of interfering BSS, there will always be such an idle period. The access point sets its post-backoff delay so that it transmits always right at the end of the CFB sequence. That is, if at time t, an idle >PIFS has been detected, the access point's backoff at time t is Bkoff−x(t), where x(t) is the number of idle time slots after PIFS. FIG. 9 illustrates this start-up procedure for a new access point, HC2, given an existing access point, HC1.

Interference Sensing

Interference sensing is the mechanism by which the occupancy status of a channel is determined. The access point only needs to know of channel activity in interfering BSSs. The best interference sensing mechanism is one that ensures that the channel is not used simultaneously by potentially interfering users. This involves listening to the channel by both the access point and stations. If the access point alone checks whether the channel is idle, the result does not convey adequate information on the potential for interference at a receiving station, nor does it address the problem of interference caused to others by the transmission, as an access point may not be able to hear transmissions from its neighboring access points, yet there is potential of interference to stations on the boundary of neighboring BSS. Stations must detect neighboring BSS beacons and forward the information to their associated access point. However, transmission of this information by a station would cause interference within the neighboring BSS.

In order to enable communication of channel occupancy information to neighboring access points, the following mechanism is proposed. When a beacon packet is transmitted, and before transmission of any other data or polling packets, all stations not associated with the access point that hear the beacon will respond by sending a frame, the contention-free time response (CFTR), that will contain the duration of the contention-free period found in the beacon. An associated station will transmit the remaining duration of the contention-free period when polled. An access point in neighboring BSSs, or stations attempting contention-based channel access, that receive this message from a station in the BSS overlapping region are thus be alerted that the channel has been seized by a BSS. Similar to a station's NAV, an inter-BSS NAV (IBNAV) will be set at the access point accordingly indicating the time the channel will be free again. Unless the IBNAV is reset, the access point will decrease its backoff value only after the expiration of the IBNAV, according to the backoff countdown rules.

Alternatively, if beacons are sent at fixed time increments, receipt of the CFTR frame would suffice to extend the IBNAV. The alternative would be convenient in order to obviate the need for full decoding of the CFTR frame. It is necessary, however, that the frame type of CFTR be recognizable.

Contention by E-DCF traffic while various interfering BSSs attempt to initiate their contention-free period can be lessened by adjusting the session length used to update the NAV and IBNAV. The contention-free period length is increased by a period IBCP (inter-BSS contention period) during which the access points only will attempt access of the channel using the backoff procedure, while ESTAs wait for its expiration before attempting transmission. This mechanism can reduce the contention seen by the centralized protocols when employing either type of backoff delay—random or deterministic.

QoS Management

A QoS-capable centralized protocol will have traffic with different time delay requirements queued in different priority buffers. Delay-sensitive traffic will be sent first, followed by traffic with lower priority. A BSS will schedule transmissions from separate queues so that the QoS requirements are met. It will transmit its top priority packets first, as described before. Once the top priority traffic has been transmitted, the BSS would attempt to transmit lower priority traffic in the CFBs allotted.

Three parameters are employed to help manage QoS. The deterministic backoff delay, Bkoff, and the maximum length of a CFB and of a DCF transmission. Since these parameters determine the relative allocation of the channel time between the centralized and distributed protocols, they can be adjusted to reflect the distribution of the traffic load between the two protocols. It must be kept in mind, however, that the same value of Bkoff should be used by all interfering BSSs.

QoS Guarantees

To enable high priority traffic to be delivered within guaranteed latency limits, a variation of the above method is described. CFBs of an access point are separated into two types, or tiers. The first contains time sensitive data and is sent when the period TXdt expires. The second tier contains time non-sensitive traffic and is sent when the backoff counter expires as a result of the countdown procedure. When all neighboring BSS have a chance to transmit their time sensitive traffic, the channel is available for additional transmissions before needing to transmit time-sensitive traffic again. Lower priority contention-free data can be then transmitted, using a backoff-based procedure.

Tier II CFBs can be initiated in various methods. Two will be described here. They are: (1) random post-backoff, and (2) deterministic post-backoff. Both methods use the same AIFS used for top-priority EDCF transmissions, in order to avoid conflict with Tier I CFBs (i.e. an AIFS=PIFS). Conflict with top priority EDCF transmissions can be mitigated in case (1) or prevented in case (2) through the use of the IBNAV with an IBCP.

Random post-backoff assigns an access point a backoff drawn from a prespecified contention window. A short contention window would lead to conflicts between Tier II CFBs. A long contention window reduces the conflict between interfering BSS attempting to access the channel at once. Long backoff values would reduce the fraction of the time the channel carries CFBs. Furthermore, the gaps created by multiple consecutive idle slots make room for DCF transmissions, reducing further the channel time available to CFBs. A long IBCP value would alleviate some of the conflict with DCF transmissions.

Deterministic post-backoff eliminates the problems present with random post-backoff. Conflicts with top priority EDCF transmissions can be prevented with an IBCP of 1. Moreover, as explained above, the Tier II CFBs generated by this method, do not conflict with one another and form contiguous repeating sequences.

Non-Conflicting Contiguous Sequences of Tier I CFBs

Periodic transmission is achieved by maintaining a timer which is reset at the desired period TXdt as soon as the timer expires. A CFB is initiated upon expiration of the timer. As long as Tier I contention-free periods are all made the same size (by adding time non-critical traffic), which is not less than the maximum DCF transmission or Tier II CFB length, it is possible for the contention-free periods of a cluster of neighboring/overlapping BSSs to repeat in the same order without a collision between them. CFBs of different BSSs can be made to follow one another in a contiguous sequence, thus maximizing access of the centralized protocol to the channel. This can be seen as follows.

Given a sequence of successful CFBs initiated by different BSSs, subsequent CFBs will not conflict because their timers will expire at least TICFBLength apart. If the leading access point's timer expires while the channel is busy, it will be able to start a new CFB before the follower HC because DCF transmissions are of equal or shorter length, and Type II CFBs have equal or shorter length.

Figure 10:
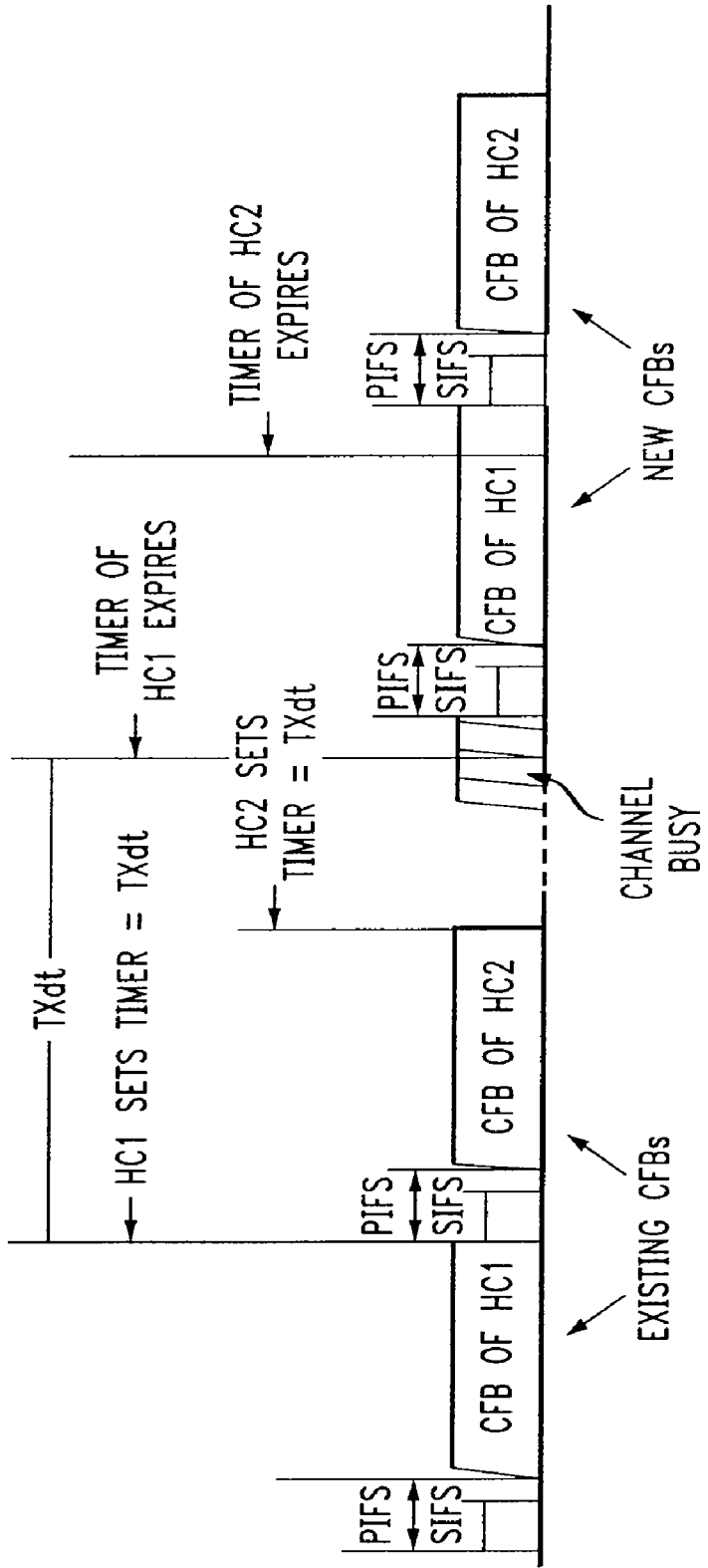
FIG. 10 shows the relationship of repeating sequences of Tier I CFBs.

If the previous CFBs were contiguous (that is, if consecutive CFBs were separated by idle gaps of length PIFS), the new CFBs will be also continuous because the follower's timer will expire on or before the completion of the leader's CFB because their CFBs have the same length. Channel access attempts by E-DCF stations or Tier II CFBs require an idle gap of length equal to DIFS or greater, and hence they cannot be interjected. FIG. 10 shows the relationship of repeating sequences of Tier I CFBs.

Figure 11:
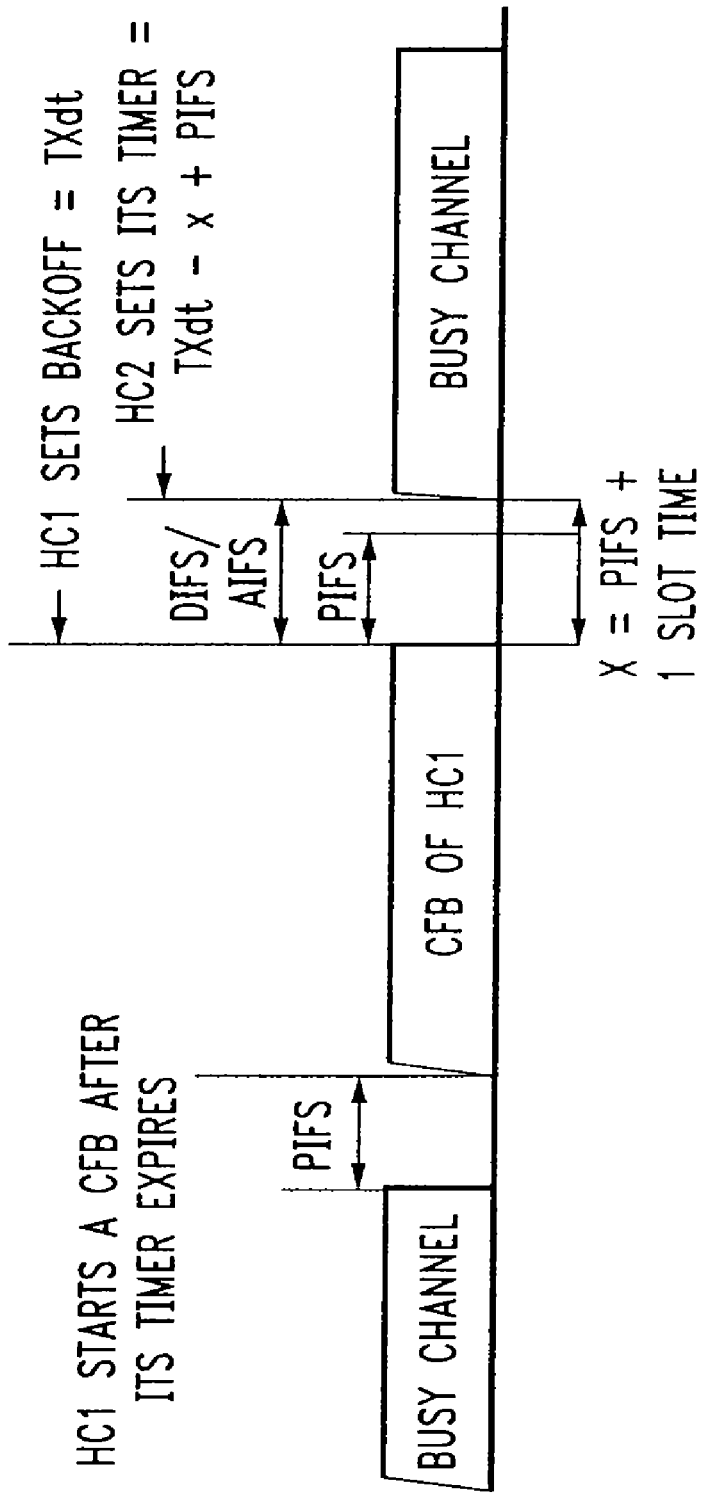
FIG. 11 illustrates the start-up procedure for a new access point, HC2, given an existing access point, HC1.

Finally it is shown how such a contiguous sequence can constructed by analyzing how a new access point initiates its first Tier I CFB. Every time a new access point is installed, it must find its position in the repeating sequence of CFBs. The new access point listens to the channel for the desired cycle, trying to recognize the sequence. It listens for an "idle" PIFS following a busy channel. When that occurs, or after a period TXdt, whichever comes first, the new access point starts looking for the first idle longer than PIFS, which signifies the end of the sequence of Tier I CFBs. As long as the TXdt is to greater than the number of interfering BSS times the duration of a Tier I CFB, TICFBLength, there will always be such an idle period. The access point sets its timer so that it transmits always right at the end of the CFB sequence. That is, if at time t, an idle of length $X(t)$>PIFS has been detected, the access point's timer at time t is TXdt−$X(t)$+PIFS. FIG. 11 illustrates this start-up procedure for a new access point, HC2, given an existing access point, HC1.

Possibility of Collisions

Though the backoff delays are set in a deterministic manner, there are no guarantees that collisions will always be avoided. Unless all access points sense the start and end of CFBs at the same time, there is the possibility that interfering BSSs will attempt to access the channel at once. This situation arises when there is significant distance between access points, but not sufficient to eliminate interference between them. Such a situation can be alleviated through the assignment for different channels.

Arbitration times are assigned to a centralized access protocol that co-exists with ESTAs accessing the channel through E-DCF. The centralized access protocol has the top priority, while E-DCF can offer traffic classes with priority access both above and below that provided by legacy stations using DCF.

Table 1 illustrates the parameter specification for K+1 different classes according to the requirements given above. The centralized access protocol is assigned the highest priority classification, and hence the shortest arbitration time. The top k−1 traffic classes for the E-DCF have priority above legacy but below the centralized access protocol; they achieve differentiation through the variation of the contention window size as well as other parameters. E-DCF traffic classes with priority above legacy have a lower bound, rLower, of the distribution from which backoff values are drawn that is equal to 1 or greater. Differentiation for classes with priority below legacy is achieved by increasing arbitration times; the lower bound of the random backoff distribution can be 0.

TABLE 1

TCMA Priority Class Description

| Priority Class | Description | Arbitration time | rLower |
|---|---|---|---|
| 0 | Centralized access protocol CFBs | SIFS | >=1 |
| 1 to k − 1 | E-DCF Traffic with priority above Legacy or Centralized access protocol Tier II CFBs | PIFS = SIFS + 1 (slot time) | >=1 |
| k | E-DCF Legacy-equivalent traffic priority | DIFS = SIFS + 2 (slot time) | 0 |
| n = k + 1 to K | E-DCF Traffic priority below Legacy | >DIFS = SIFS + (2 + n − k) (slot time) | 0 |

BSSs within short interfering range of one another can compete for and share the channel through the use of a deterministic backoff procedure employing post-backoff. Contiguous repeating sequences of contention-free periods provide the centralized protocol efficient access to the channel which is shared by E-DCF transmissions. The relative channel time allotted to the two protocols can be adjusted by tuning parameters of the protocol. Scheduling of traffic queued in multiple queues at the access point can meet QoS requirements. More stringent latency requirements can be met with a two-tiered method, which employs both a timer and post-backoff to initiate CFBs.

CFB contiguity is preserved when using deterministic post-backoff or if CFBs of constant length are used whenever transmission is caused by the expiration of the TXdt timer—the Tier I approach. Contiguity is not necessarily preserved, however, if the CFBs have variable length when the Tier I approach is used. Any gaps that would arise in this case would allow contention-based transmissions to be interjected, thus risking delays and possible collisions between HCs.

Because of the fixed CFB length requirement, whereas the Tier I approach delivers regularly-spaced CFBs, using it alone, without a Tier II protocol, results in inefficient utilization of the channel. The same fixed bandwidth allocation to each BSS gives rise to situations where channel time allocated for a CFB to one BSS may be left idle while another BSS is overloaded. The Tier II protocols provide for dynamic bandwidth allocation among BSSs.

Various illustrative examples of the invention have been described in detail. In addition, however, many modifications and changes can be made to these examples without departing from the nature and spirit of the invention.

The invention claimed is:

1. A method for enabling a plurality of wireless cells to have contention-free access to a medium, each cell including a respective plurality of member stations, comprising:
assigning a value for a first inter-cell contention-free period to a first access point station in a first cell, associated with an accessing order in the medium for member stations in the first cell and a second cell of the plurality of cells during a transmission frame;
transmitting by the first access point station in the first cell, a beacon packet containing the value for the first inter-cell contention-free period; and
receiving the beacon packet at an overlapped station occupying the first cell and the second cell, and forwarding the value for the first inter-cell contention-free period to member stations in the second cell, to delay transmissions by member stations in the second cell until after the first inter-cell contention free period has expired.

2. The method of claim 1, further comprising:
assigning a value for a second inter-cell contention-free period to a second access point station in the second cell, associated with the accessing order;
transmitting by the second access point station in the second cell, a second beacon packet containing the value of the second inter-cell contention-free period; and
receiving the second beacon packet at a station occupying the first cell and the second cell, and forwarding the value of the second inter-cell contention-free period to member stations in the first cell to delay transmissions by member stations in the first cell until after the second inter-cell contention-free period has expired.

3. The method of claim 2, further comprising:
receiving the value of the first inter-cell contention-free period and the value of the second inter-cell contention-free period at a third access point station in a third cell;
selecting a backoff time for the third access point station following the second inter-cell contention-free period, to begin transmission by the third access point station in the third cell of a third beacon packet containing a value for a third inter-cell contention-free period; and
receiving the third beacon packet at a station occupying the first cell and at a station occupying the second cell, and forwarding the third value of the third inter-cell contention-free period to member stations in the first cell and the second cell to delay transmissions by member stations in the first cell and the second cell until after the third inter-cell contention-free period has expired.

4. The method of claim 2, further comprising:
transmitting in the first beacon packet to member stations in the first cell, a value for an intra-cell contention-free period, during which member stations in the first cell will delay accessing the medium.

5. The method of claim 2, further comprising:
transmitting a peg packet by the second access point station in the second cell to deter member stations in the first cell from contending for the medium.

6. A method for enabling a plurality of wireless cells to have contention-free access to a medium, each cell including a respective plurality of member stations, comprising:
assigning a value for a first inter-cell contention-free period to a first access point station in a first cell, associated with an accessing order in the medium for member stations in the first cell and a second cell of the plurality of cells during a transmission frame;
transmitting by the first access point station in the first cell, a beacon packet containing the value of the first inter-cell contention-free period;
assigning a value to a second inter-cell contention-free period to a second access point station in the second cell, associated with the accessing order; and
transmitting by the second access point station in the second cell, a second beacon packet containing the value of the second inter-cell contention-free period.

7. The method of claim 6, further comprising:
receiving the value of the first inter-cell contention-free period and the value of the second inter-cell contention-free period at a third access point station in a third cell; and selecting a backoff time for the third access point station following the second inter-cell contention free period, to begin transmission by the third access point station in the third cell of a third beacon packet containing a value for a third inter-cell contention-free period.

8. The method of claim 7, further comprising:
receiving the value of the third inter-cell contention-free period at member stations in the first cell and the second cell to delay transmissions by member stations in the first cell and the second cell until after the third inter-cell contention-free period has expired.

9. The method of claim 7, further comprising:
transmitting a peg packet by the third access point station in the third cell to deter member stations in the first cell from contending for the medium.

10. The method of claim 6, further comprising:
transmitting in the first beacon packet to member stations in the first cell, a value for an intra-cell contention-free period, during which member stations in the first cell will delay accessing the medium.

11. A system for enabling a plurality of wireless cells to have contention-free access to a medium, each cell including a respective plurality of member stations, comprising:
means for assigning a value for a first inter-cell contention-free period to a first access point station in a first cell, associated with an accessing order in the medium for member stations in the first cell and a second cell of the plurality of cells during a transmission frame;
means for transmitting by the first access point station in the first cell, a beacon packet containing the value of the first inter-cell contention-free period; and
means for receiving the beacon packet at a station occupying the first cell and the second cell, and forwarding the value of the first inter-cell contention-free period to member stations in the second cell, to delay transmissions by member stations in the second cell until after the first inter-cell contention free period has expired.

12. The system of claim 11, further comprising:
means for assigning a value for a second inter-cell contention-free period to a second access point station in the second cell, associated with the accessing order;
means for transmitting by the second access point station in the second cell, a second beacon packet containing the value of the second inter-cell contention-free period; and
means for receiving the second beacon packet at a station occupying the first cell and the second cell, and forwarding the value of the second inter-cell contention-free period to member stations in the first cell to delay transmissions by member stations in the first cell until after the second inter-cell contention-free period has expired.

13. The system of claim 12, further comprising:
means for receiving the value of the first inter-cell contention-free period and the value of the second inter-cell contention-free period at a third access point station in a third cell;
selecting a backoff time for the third access point station following the second inter-cell contention-free period, to begin transmission by the third access point station in the third cell of a third beacon packet containing a value for a third inter-cell contention-free period; and
receiving the third beacon packet at a station occupying the first cell and at a station occupying the second cell, and forwarding the value of the third inter-cell contention-free period to member stations in the first cell and the second cell to delay transmissions by member stations in the first cell and the second cell until after the third inter-cell contention-free period has expired.

14. The system of claim 12, further comprising:
means for transmitting in the first beacon packet to member stations in the first cell, a value for an intra-cell contention-free period, during which member stations in the first cell will delay accessing the medium.

15. The system of claim 12, further comprising:
means for transmitting a peg packet by the second access point station in the second cell to deter member stations in the first cell from contending for the medium.

* * * * *